(12) United States Patent
Myerberg et al.

(10) Patent No.: US 12,070,799 B2
(45) Date of Patent: Aug. 27, 2024

(54) PROFILED RAILS FOR IN MULTI-DIRECTIONAL BINDER JETTING

(71) Applicant: Desktop Metal, Inc., Burlington, MA (US)

(72) Inventors: Jonah Myerberg, Lexington, MA (US); Ricardo Fulop, Lexington, MA (US); Richard Fontana, Cape Elizabeth, ME (US); Charles Edward Martin, Freedom, NH (US); Brett Schuster, Hollis, NH (US); Emanuel Michael Sachs, Newton, MA (US)

(73) Assignee: Desktop Metal, Inc., Burlington, MA (US)

( * ) Notice: Subject to any disclaimer, the term of this patent is extended or adjusted under 35 U.S.C. 154(b) by 0 days.

(21) Appl. No.: 16/327,915

(22) PCT Filed: Apr. 20, 2018

(86) PCT No.: PCT/US2018/028697
§ 371 (c)(1),
(2) Date: Feb. 25, 2019

(87) PCT Pub. No.: WO2019/203856
PCT Pub. Date: Oct. 24, 2019

(65) Prior Publication Data
US 2021/0346962 A1   Nov. 11, 2021

(51) Int. Cl.
*B22F 12/00* (2021.01)
*B22F 10/14* (2021.01)
(Continued)

(52) U.S. Cl.
CPC ............. *B22F 12/222* (2021.01); *B22F 10/14* (2021.01); *B22F 10/68* (2021.01); *B22F 10/80* (2021.01);
(Continued)

(58) Field of Classification Search
CPC ........ B22F 12/222; B22F 10/68; B22F 12/63; B22F 10/80; B22F 12/70; B22F 12/53;
(Continued)

(56) References Cited

U.S. PATENT DOCUMENTS 6,596,224 B1 * 7/2003 Sachs .................... B29C 64/112
                                                              425/84
9,132,587 B2 * 9/2015 Eshed .................... B33Y 30/00
(Continued)

FOREIGN PATENT DOCUMENTS

GB           2311960 A  * 10/1997  .......... B29C 64/147

*Primary Examiner* — Seyed Masoud Malekzadeh
(74) *Attorney, Agent, or Firm* — Ethos Legal, PLLC; Jonathan D. Hall

(57) ABSTRACT

The devices, systems, and methods of the present disclosure are directed to spreader positioning techniques for consistent and rapid layer-by-layer fabrication of three-dimensional objects formed through binder jetting. For example, an additive manufacturing system may include a roller and a print carriage. In a layer-by-layer fabrication process, the roller may move in advance of the print carriage over a dimension of a volume to spread a respective layer of powder onto which the print carriage delivers a binder. Controlling the position of the roller may facilitate achieving consistent layer characteristics which, in turn, may facilitate fabrication of high quality parts.

2 Claims, 13 Drawing Sheets

(51) Int. Cl.
| | |
|---|---|
| *B22F 10/68* | (2021.01) |
| *B22F 10/80* | (2021.01) |
| *B22F 12/53* | (2021.01) |
| *B22F 12/63* | (2021.01) |
| *B22F 12/70* | (2021.01) |
| *B22F 12/90* | (2021.01) |
| *B28B 1/00* | (2006.01) |
| *B29C 64/209* | (2017.01) |
| *B33Y 30/00* | (2015.01) |
| *B33Y 40/00* | (2020.01) |
| *B33Y 50/00* | (2015.01) |
| *B22F 10/30* | (2021.01) |

(52) U.S. Cl.
 CPC .......... *B22F 12/224* (2021.01); *B22F 12/226* (2021.01); *B22F 12/53* (2021.01); *B22F 12/63* (2021.01); *B22F 12/90* (2021.01); *B28B 1/001* (2013.01); *B33Y 30/00* (2014.12); *B33Y 40/00* (2014.12); *B33Y 50/00* (2014.12); *B22F 10/30* (2021.01); *B22F 12/70* (2021.01); *B29C 64/209* (2017.08)

(58) Field of Classification Search
 CPC ....... B22F 12/224; B33Y 30/00; B33Y 40/00; B33Y 50/00; B28B 1/001; B29C 64/218; B29C 64/236; B29C 64/209; B29C 64/232
 USPC .......................................................... 425/375
 See application file for complete search history.

(56) References Cited

U.S. PATENT DOCUMENTS

| | | | |
|---|---|---|---|
| 10,981,331 B2* | 4/2021 | Barnes | B29C 64/386 |
| 11,207,829 B2* | 12/2021 | Hakkaku | B33Y 30/00 |
| 2001/0050448 A1* | 12/2001 | Kubo | B29C 64/153 425/375 |
| 2002/0105114 A1* | 8/2002 | Kubo | B29C 64/153 425/375 |
| 2008/0018018 A1* | 1/2008 | Nielsen | B29C 64/165 425/375 |
| 2016/0243765 A1* | 8/2016 | Sasaki | B33Y 30/00 |
| 2016/0368214 A1* | 12/2016 | Sasaki | B33Y 10/00 |
| 2017/0239932 A1* | 8/2017 | Knecht | B33Y 30/00 |
| 2017/0297109 A1* | 10/2017 | Gibson | B22F 3/22 |
| 2018/0001557 A1* | 1/2018 | Buller | B22F 12/90 |
| 2018/0071819 A1* | 3/2018 | Connor | B22F 10/10 |
| 2018/0304357 A1* | 10/2018 | Myerberg | B22F 1/14 |
| 2021/0187835 A1* | 6/2021 | Barnes | B29C 64/227 |

* cited by examiner ing techniques. 30

PROFILED RAILS FOR IN MULTI-DIRECTIONAL BINDER JETTING

BACKGROUND

Binder jetting is an additive manufacturing technique based on the use of a liquid binder to join particles of a powder to form a three-dimensional object. In particular, a controlled pattern of the liquid binder is applied to successive layers of the powder in a powder bed such that the layers of the powder adhere to one another form a three-dimensional object. The three-dimensional object is then densified into a finished part through subsequent processing, such as sintering.

The binder jetting fabrication process used to form the three-dimensional objects, however, can present certain challenges with respect to quality and throughput of finished parts formed from the three-dimensional objects. In particular, consistent layer-by-layer distribution of the powder and the liquid binder to form the three-dimensional object is important for achieving target quality of the finished part formed from the three-dimensional object. However, the time associated with consistent layer-by-layer distribution of the powder and the liquid binder can have an adverse impact on the commercial scale viability of binder jetting as an additive manufacturing technique to form finished parts. Thus, there generally remains a need for improving speed in the layer-by-layer distribution of the powder and liquid binder while maintaining or improving quality of three-dimensional objects formed using binder jetting techniques.

SUMMARY

The devices, systems, and methods of the present disclosure are directed to spreader positioning techniques for consistent and rapid layer-by-layer fabrication of three-dimensional objects formed through binder jetting. For example, an additive manufacturing system may include a roller and a print carriage. In a layer-by-layer fabrication process, the roller may move in advance of the print carriage over a dimension of a volume to spread a respective layer of powder onto which the print carriage delivers a binder. Controlling the position of the roller may facilitate achieving consistent layer characteristics which, in turn, may facilitate fabrication of high quality parts.

According to one aspect, an additive manufacturing system may include a print box defining a volume having a lateral dimension, a print carriage bidirectionally movable along the lateral dimension, above the volume, the print carriage defining at least one ejection orifice directed toward the volume as the print carriage moves above the volume, and a roller bidirectionally movable along the lateral dimension, above the volume, to spread a powder across the volume, wherein the print carriage and the roller are movable relative to one another such that the roller is positioned in advance of the print carriage in each direction of bidirectional movement of the print carriage and the roller along the lateral dimension, above the volume.

In certain implementations, spacing between the roller and the print carriage may be adjustable relative to a plane defined by a top of the volume, in coordination with the bidirectional movement of the print carriage and the roller, to swap an orientation of the print carriage and the roller relative to the lateral dimension of the volume. For example, the spacing between the roller and the print carriage may be adjustable to position the roller and the print carriage on opposite sides of the plane. Additionally, or alternatively, spacing between the roller and the print carriage may be adjustable to position the roller below the plane as the print carriage, above the plane, is movable past the roller in a direction parallel to the lateral dimension of the volume to swap the orientation of the print carriage and the roller. Further, or instead, the spacing between the roller and the print carriage may be adjustable to return the roller from a position below the plane to a position above the plane.

In some implementations, the system may further include a wash station at the one or more positions lateral to the lateral dimension of the volume, wherein the wash station is configured to disperse cleaning fluid toward the at least one ejection orifice of the print carriage. Further, or instead, the system may further include a camera and a substrate, wherein the camera and the substrate are at the one or more positions lateral to the lateral dimension of the volume, the print carriage is positionable relative to the substrate to eject a fluid from the at the at least one ejection orifice to the substrate, and the camera is directed at the substrate to record a spray pattern of the fluid from the at least one ejection orifice.

According to another aspect, an additive manufacturing system may include a print box defining a volume having a lateral dimension, a print carriage movable above the volume, the print carriage defining at least one orifice directed toward the volume as the print carriage moves above the volume, a roller movable above the volume to spread a powder across the volume, and a z-stage actuator coupled to one of the print carriage or the roller, the z-stage actuator actuatable, in coordination with bidirectional movement of the print carriage and the roller parallel to the lateral dimension, to swap an orientation of the print carriage and the roller relative to the lateral dimension of the volume such that the roller is positioned in advance of the print carriage in each direction of bidirectional movement of the print carriage and the roller parallel to the lateral dimension, above the volume.

In certain implementations, the z-stage actuator may be adjustable to vary a height of the roller associated with movement of the roller above the volume to spread the powder across the volume. Additionally, or alternatively, the z-stage actuator may be actuatable to adjust relative spacing between the print carriage and the roller in a direction perpendicular to a plane defined by a top of the volume. For example, the print box may further defines a first recess and a second recess, the first recess and the second recess are on opposite sides of the volume along the lateral dimension, each of the first recess and the second recess extends below the plane defined by the top of the volume, and the z-stage actuator is actuatable to move at least a portion of the roller below the plane into and out of the first recess and the second recess. In certain instances, with the at least a portion of the roller retracted into the first recess or into the second recess below the plane, the print carriage may be above the plane.

In some implementations, the system may further include a first rail and a second rail different from the first rail, the first rail and the second rail each outside of the volume, the first rail and the second rail each parallel to the lateral dimension, the print carriage movable above the volume along the first rail, and the roller movable above the volume along the second rail. For example, the first rail and the second rail may be spaced relative to one another in a direction perpendicular to the lateral dimension of the volume, the z-stage actuator is coupled to one of the first rail or the second rail, and the z-stage actuator is actuatable to adjust spacing between the first rail and the second rail. Additionally, or alternatively, the other one of the first rail or the second rail may be fixed relative to the volume. Further, or instead, at least a portion of the first rail may be above a plane defined by the top of the volume, and at least a portion of the second rail may be below the plane defined by the top of the volume. Still further or instead, the system may further include a brush including filaments having free ends, wherein the brush is coupled to the roller to move with the roller along the second rail, and the free ends of at least some of the filaments are in contact with the second rail as the roller moves along the second rail. Additionally, or alternatively, the system may further include a gas source, the gas source positioned to direct a flow of a gas over the second rail.

According to yet another aspect, the additive manufacturing system may include a print box defining a volume having a lateral dimension, a print carriage movable above the volume, the print carriage defining at least one orifice directed toward the volume as the print carriage moves above the volume, a roller transverse to the lateral dimension, and a swing arm including an elongate member having a first end region and a second end region, a first joint disposed along the first end region, and a second joint disposed along the second end region, the elongate member pivotably coupled to the print carriage along a first joint and pivotably coupled to the roller along a second joint, and the swing arm actuatable to pivot the elongate member about the first joint and the second joint to move the roller along a substantially arcuate path relative to the print carriage to position the roller in advance of the print carriage in each direction of bidirectional movement of the print carriage and the roller along the lateral dimension, above the volume. In certain implementations, the system may further include a rail, wherein the print carriage and the roller are bidirectionally movable on the rail along the lateral dimension, above the volume. Additionally, or alternatively, the elongate member may be lockable in a fixed position relative to the first joint and the second joint as the print carriage and the roller move along the lateral dimension, above the volume.

According to yet another aspect, an additive manufacturing system may include a print box defining a volume having a lateral dimension, a first rail outside of the volume, a print carriage defining at least one ejection orifice, the print carriage movable on the first rail, along the lateral dimension, and above the volume, a second rail outside of the volume, and a roller movable on the second rail, along the lateral dimension, and above the volume, the first rail and the second rail shaped relative to one another to adjust spacing between the roller and the print carriage such that, in coordination with movement of the print carriage and the roller along the first rail and the second rail, respectively, the roller is positioned in advance of the print carriage in each direction of bidirectional movement of the print carriage and the roller across the lateral dimension, above the volume.

In certain implementations, the first rail and the second rail may be shaped relative to one another to adjust the spacing between the roller and the print carriage in a direction perpendicular to a plane defined by a top of the volume. For example, the first rail and the second rail may be shaped relative to one another to adjust the spacing between the roller and the print carriage at one or more positions lateral to the lateral dimension of the volume.

In certain implementations, at least one of the first rail or the second rail may be axially nonlinear. Additionally, or alternatively, respective portions of the first rail and the second rail, corresponding to travel of the print carriage and the roller along the lateral dimension, above the volume, are substantially parallel to one another. As a more specific example, the respective portions of the first rail and the second rail may be substantially linear. Further, or instead, the first rail may be axially nonlinear along a portion of the first rail corresponding to travel of the print carriage along the lateral dimension, above the volume. For example, the first rail may include a substantially parabolic section having a minimum along the lateral dimension, above the volume.

In certain implementations, the roller may be movable along the lateral dimension, above the volume, at a substantially fixed distance above the volume. Additionally, or alternatively, the roller may have an axial dimension substantially perpendicular to the lateral dimension of the volume as the roller moves on the second rail along the lateral dimension, above the volume. Further, or instead, the print carriage may span a dimension of the volume substantially perpendicular to the lateral dimension as the print carriage moves, on the first rail, along the lateral dimension, above the volume.

In some implementations, the print carriage may include an optical encoder configured to sense position of the print carriage on the first rail as the print carriage moves, on the first rail, along the lateral dimension, above the volume. Additionally, or alternatively, the print carriage may include an optical encoder directed at the volume, the optical encoder configured to sense position of the print carriage relative to the volume as the print carriage moves, on the first rail, along the lateral dimension, above the volume.

In certain implementations, the system may further include a gas source, the gas source positioned to direct a flow of a gas over the second rail. For example, the gas source may be positioned to direct the flow of the gas longitudinally over the second rail.

According to yet another aspect, an additive manufacturing method may include moving a roller repeatedly across a dimension of a volume defined by a print box, the roller rotating about an axis transverse to the dimension of the volume as the roller moves across the dimension, each movement of the roller across the dimension spreading a respective layer of a plurality of layers of a powder across the print box, controlling a position of the roller based on one or more predetermined landmarks along the dimension of the volume, and delivering a binder to each layer of the powder in a controlled two-dimensional pattern associated with the respective layer, the controlled two-dimensional patterns of the layers of the plurality of layers collectively defining a three-dimensional object in the print box.

In some implementations, the one or more predetermined landmarks may include a position corresponding substantially to a first edge of the print box first encountered by the roller as the roller is moved across the dimension of the volume. Further, or instead, the one or more predetermined landmarks may include one or more positions away from edges of the print box. Additionally, or alternatively, the one or more predetermined landmarks may be at regular distance intervals along the dimension of the volume.

In certain implementations, moving the roller repeatedly across the dimension of the volume may include moving the roller bidirectionally across the dimension of the volume, and each pass of the roller across the dimension of the volume forms a respective layer of the plurality of layers. Additionally, or alternatively, the rotation of the roller may be controlled based on the one or more predetermined landmarks for each direction of movement of the roller across the dimension of the volume. For example, the rotation of the roller may be controlled based on a first subset of the one or more predetermined landmarks in a first direction of movement and based on a second subset of the one or more predetermined landmarks in a second direction of movement opposite the first direction of movement, and the second subset is at least partially different from the first subset. Further, or instead, the rotation of the roller may be about the axis is in a direction opposite to a direction of movement of the roller across the dimension of the volume. Still further, or instead, controlling the position of the roller may be based on the one or more predetermined landmarks along the dimension of the print box includes synchronizing one or more angular positions of the roller, as the roller rotates about the axis, to the one or more predetermined landmarks as the roller moves across the dimension of the volume. As an example, synchronizing the one or more angular positions may include receiving a signal from a rotary encoder positioned to measure rotation of the roller about the axis. As an additional or alternative example, synchronizing the one or more angular positions may include receiving a signal from a linear encoder positioned to measure the movement the roller moving along the dimension of the volume.

In some implementations, the position of the roller may be controlled between formation of successive layers of the plurality of layers. Further, or instead, the position of the roller may be controlled as the roller is moved across the dimension of the volume. Additionally, or alternatively, controlling the position of the roller based on the one or more predetermined landmarks includes controlling one or more of an angular velocity of the roller about the axis. Still further or instead, controlling the position of the roller based on the one or more predetermined landmarks may include controlling a linear velocity of the roller across the dimension of the volume.

According to yet another aspect, a computer program product encoded on one or more non-transitory computer storage media, may include instructions that, when executed by one or more computing devices, cause the one or more computing devices to perform operations including moving a roller across a dimension of a volume defined by a print box, the roller rotating about an axis transverse to the dimension as the roller moves across the dimension to spread a layer of a powder across the volume, controlling a position of the roller based on one or more predetermined landmarks along the dimension of the volume, and delivering a binder to the layer of the powder in a controlled two-dimensional pattern associated with the layer.

In certain implementations, moving the roller across the dimension of the volume may include rotating the roller about the axis in a direction opposite to a direction of movement of the roller across the dimension of the volume. Additionally, or alternatively, controlling the position of the roller based on the one or more predetermined landmarks along the dimension of the volume may include synchronizing one or more angular positions of the roller rotating about the axis to the one or more predetermined landmarks as the roller moves across the dimension of the volume. As an example, synchronizing the one or more angular positions may include receiving a signal from a rotary encoder positioned to measure rotation of the roller about the axis. Further, or instead, synchronizing the one or more angular positions may include receiving a signal from a linear encoder positioned to measure movement the roller moving along the dimension of the volume.

BRIEF DESCRIPTION OF THE DRAWINGS

The devices, systems, and methods described herein are set forth in the appended claims. However, for the purpose of explanation, several implementations are set forth in the following drawings:

DESCRIPTION

Figure 1A:
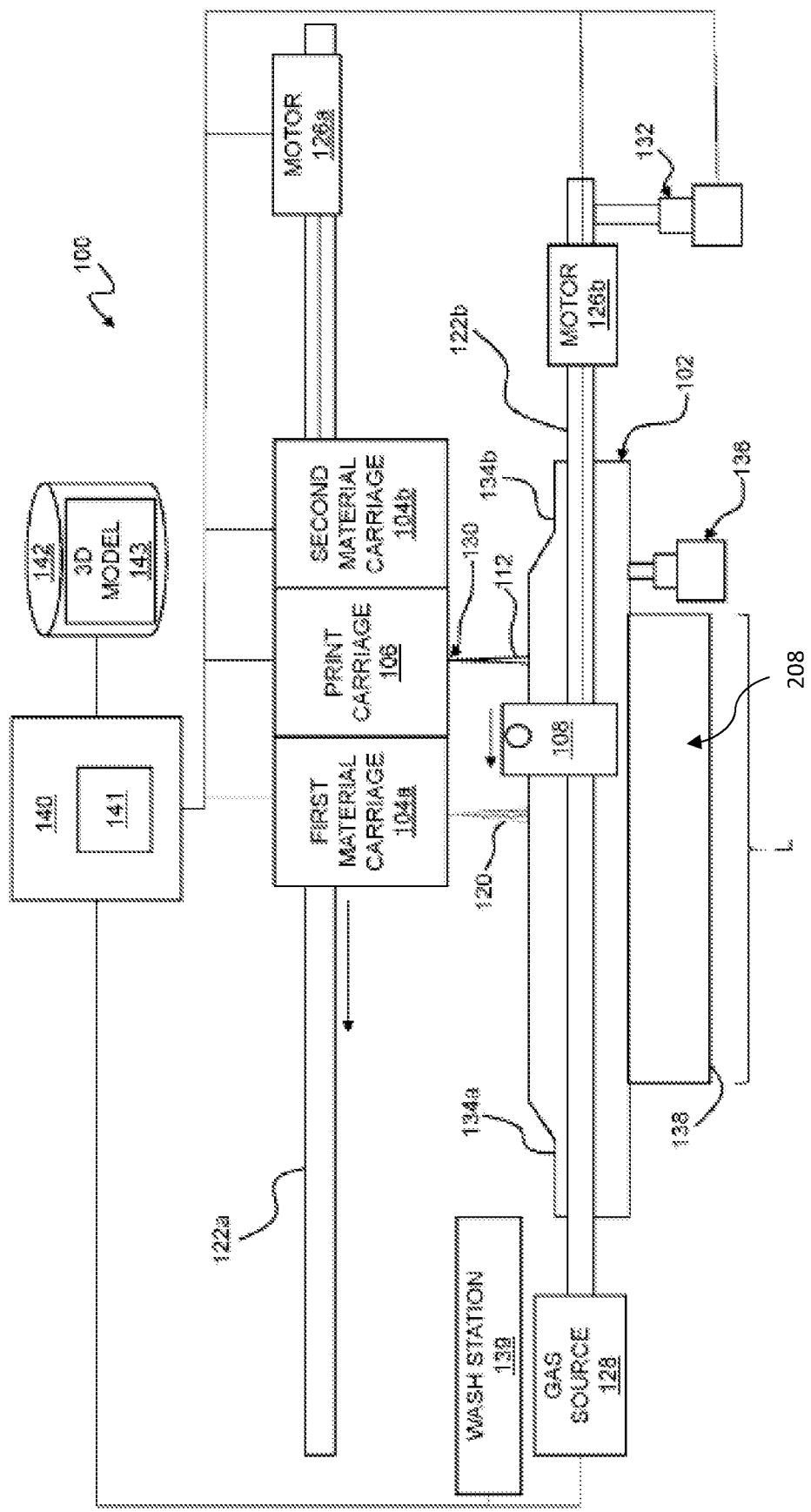
FIGS. 1A-1D each include a schematic representation of an additive manufacturing system and, collectively, represent time-sequence of operation of the additive manufacturing system in a multi-directional binder jetting process to form a three-dimensional object.

Embodiments will now be described with reference to the accompanying figures. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the terms "or" and "and" should each generally be understood to mean "and/or.".

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms.

As used herein, the term two-dimensional slice should be understood to refer to a cross-sectional segment of a three-dimensional object, with the cross-sectional segment having a small thickness (e.g., greater than about 40 microns and less than about 150 microns) in a third dimension. That is, the thickness of the two-dimensional slice may be substantially smaller than either dimension of the cross-sectional segment in the other two dimensions. In general, two-dimensional slices may be formed on top of one another to form a three-dimensional object.

As also used herein, the term "z-stage" should be understood to refer to movement in along an axis substantially perpendicular to a plane defined by a top of a volume in which a three-dimensional object is being formed and is sometimes referred to a vertical stage. Thus, unless otherwise specified or made clear from the context, the z-stage corresponds to an axis along which layers of a layer-by-layer binder jetting process are formed on top of one another. This axis may include, for example, a vertical axis. By way of further example, therefore, a z-stage actuator may include an actuator (e.g., a linear actuator) controllable to move a component along a vertical axis or, more generally, along an axis substantially perpendicular to the plane defined by the top of the volume.

For the sake of clarity and completeness of explanation, the description that follows describes the use of devices, systems, and methods in the context of multi-directional binder jetting—that is, binder jetting fabrication techniques in which layers of powder are spread in at least two different directions in the course of fabricating a three-dimensional object and, additionally or alternatively, binder is applied to layers from a print carriage moving over a volume in at least two different directions. However, unless otherwise specified or made clear from the context, the description of devices, systems, and methods with respect to multi-directional binder jetting herein should not be understood to preclude the use of such devices, systems, and methods in the degenerate case of binder jetting along only a single direction.

Referring now to FIGS. 1A-1D and FIGS. 2A-2B, an additive manufacturing system 100 may include a print box 102, a first material carriage 104a, a second material carriage 104b, a print carriage 106, and a roller 108. The print box 102 may define a volume 208 having a lateral dimension L. The print carriage 106 and the roller 108 may be bidirectionally movable over the lateral dimension L of the volume 208 to form a three-dimensional object 210 in the volume 208 by jetting a binder 112 (e.g., a polymeric binder) along layers of powder 120 (e.g., a powder including inorganic particles, such as metal particles, ceramic particles, or a combination thereof) spread in the volume 208. As described in greater detail below, following completion of each pass of the roller 108 and the print carriage 106 over the lateral dimension L of the volume 208, the roller 108 may be lowered along a z-stage and the print carriage 106 may move over the roller 108 to switch the order of the print carriage 106 and the roller 108 relative to the lateral dimension L of the volume 208. By repeating this positional switching in each direction of bidirectional movement of the print carriage 106 and the roller 108, the roller 108 may precede the print carriage 106 in each direction of bidirectional movement of the print carriage 106 and the roller 108 along the lateral dimension L above the volume 208. Thus, more generally, the print carriage 106 and the roller 108 may be movable relative to one another to carry out multi-directional binder jet fabrication using only a single instance of the roller 108. The use of a single instance of the roller 108 to carry out multi-directional binder jetting may be particularly useful for achieving rapid fabrication rates while reducing the likelihood of directional artifacts—such as those that may occur through the use of different instances of rollers in each direction—that may impact quality of finished parts formed from the three-dimensional object 210.

In certain implementations, the additive manufacturing system 100 may include a first rail 122a and a second rail 122b. In general, the first rail 122a and the second rail 122b may each be positioned outside of the volume 208. Additionally, or alternatively, one or both of the first rail 122a and the second rail 122b may be shielded from one or more of the first material carriage 104a, the print carriage 106, the second material carriage 104b, and the volume 208 to reduce the likelihood of contamination of the respective instance of the first rail 122a and the second rail 122b through extended use.

The print carriage 106 may be bidirectionally movable along the first rail 122a to move back and forth over the volume 208 along the lateral dimension L. Similarly, the roller 108 may be bidirectionally movable along the second rail 122b to move back and forth over the volume 208 along the lateral dimension L. In the description that follows, each of the first rail 122a and the second rail 122b are described as respective single rails. However, unless otherwise indicated or made clear from the context, it should be appreciated that one or more of the first rail 122a and the second rail 122b may include a plurality of rails, such as may be useful for stabilizing movement of components moving along the respective rail. Additionally, or alternatively, the first material carriage 104a and the second material carriage may be bidirectionally movable along the first rail 122a. For example, the print carriage 106, the first material carriage 104a, and the second material carriage 104b may move as a single unit along the first rail 122a, which may be useful for reducing complexity in positioning these components relative to one another. For the sake of efficiency and clarity of explanation, the first material carriage 104a and the second material carriage 104b should be understood to move along with the print carriage 106, unless otherwise specified or made clear from the context. Accordingly, the description of movement of the print carriage 106 should be understood to describe corresponding movement of the first material carriage 104a and the second material carriage 104b coupled to the print carriage 106.

Each of the first rail 122a and the second rail 122b may have any of various different cross-sectional shapes suitable for supporting rapid movement of the print carriage 106 and the roller 108, as the case may be, back and forth over the lateral dimension L of the volume 208. Thus, while the first rail 122a and the second rail 122b may be substantially cylindrical, it should be appreciated that other shapes are additionally or alternatively possible. For example, one or both of the first rail 122a and the second rail 122b may be a profiled rail (e.g., having a t-slotted profile), which may be useful for reducing the likelihood of unintended circumferential movement of the print carriage 106 and the roller 108, as the case may be, as each component moves axially along the respective rail. In some instances, the first rail 122a and the second rail 122b may have different shapes and/or dimensions, which may be particularly useful in implementations in which the respective loads experienced by the first rail 122a and the second rail 122b differ from one another significantly.

The first rail 122a and the second rail 122b may each be formed of any of various different materials compatible with the environment around the additive manufacturing system 100 as the additive manufacturing system 100 is in use. For example, the first rail 122a and the second rail 122b may be formed of materials resistance to reacting with environmental contaminants (e.g., fine particles of the powder 120, moisture, or a combination thereof) that may be present as the additive manufacturing system 100 is operated to form the three-dimensional object 210. As a more specific example, the first rail 122a and the second rail 122b may be formed of stainless steel or the like. Further, or instead, the first rail 122a and the second rail 122b may include any one or more of various different coatings useful for reducing degradation of the respective rail over time.

In general, the first rail 122a and the second rail 122b may be axially shaped and positioned relative to one another based at least in part on desired positioning of the print carriage 106 and the roller 108 relative to one another and/or relative to a plane 212 defined by a top of the volume 208. Thus, for example, the first rail 122a and the second rail 122b may be substantially parallel to one another and to the plane 212, at least above the lateral dimension "L" of the volume 208. With the first rail 122a and the second rail 122b positioned in this way, the print carriage 106 and the roller 108 may each move parallel to the lateral dimension L at respective predetermined distances. Further, or instead, the first rail 122a and the second rail 122b may be spaced relative to one another in a direction perpendicular to the lateral dimension L of the volume 208 such that the print carriage 106 and the roller 108 are correspondingly spaced relative to one another in this direction. Additionally, or alternatively, at least a portion of the first rail 122a may be above the plane 212, and at least a portion of the second rail 122b may be below the plane 212, which may be useful for swapping the print carriage 106 and the roller 108 relative to one another as described in greater detail below. As also described in greater detail below, the positions of one or both of the print carriage 106 and the roller 108 relative to one another and/or relative to the plane 212 may be adjusted by moving one or both of the first rail 122a and the second rail 122b along the z-stage to achieve corresponding movement of the respective component on the rail.

The additive manufacturing system 100 may include a first motor 126a and a second motor 126b. In general, the first motor 126a and the second motor 126b may be any of various different types of electrical motors known in the art and, in certain instances, may include any one or more of various different servomotors to facilitate precise positional control. The first motor 126a may be mechanically coupled to the print carriage 106 to transmit a respective motive force to the print carriage 106 to move the print carriage 106 back and forth along the first rail 122a. Similarly, the second motor 126b may be mechanically coupled to the roller 108 to transmit a respective motive force to the roller 108 to move the roller 108 back and forth along the second rail 122b. In this context, the mechanical coupling may be any of various different mechanical couplings known in the art. Thus, for example, each mechanical coupling may include any manner and form of pulleys and belts useful for transmitting force from the respective motor, in a stationary position, to the respective component or components being moved by the force provided by the motor.

In certain implementations, the additive manufacturing system 100 may include a gas source 128 positioned in proximity to the second rail 122b. In use, fine particles of the powder 120, moisture, or a combination thereof, may settle on the second rail 122b, particularly in instances in which the second rail 122b is below the plane 212 defined by the top of the volume 208 and contamination settles on the second rail 122b under the force of gravity. In significant amounts, contamination of the second rail 122b may interfere with the precision of control of movement of the roller 108 along the second rail 122b. Thus, in general, the gas source 128 may be actuatable to move a gas along the second rail 122b (e.g., in an axial direction) to remove or, further or instead, prophylactically prevent accumulation of contamination on the second rail 122b. The gas source 128 may include, for example, a source of a pressurized gas, such as air or nitrogen. Further, or instead, the gas source 128 may include a fan in fluid communication with a clean environment and operable to move air or another gas from the clean environment toward the second rail 122b.

Figure 3:
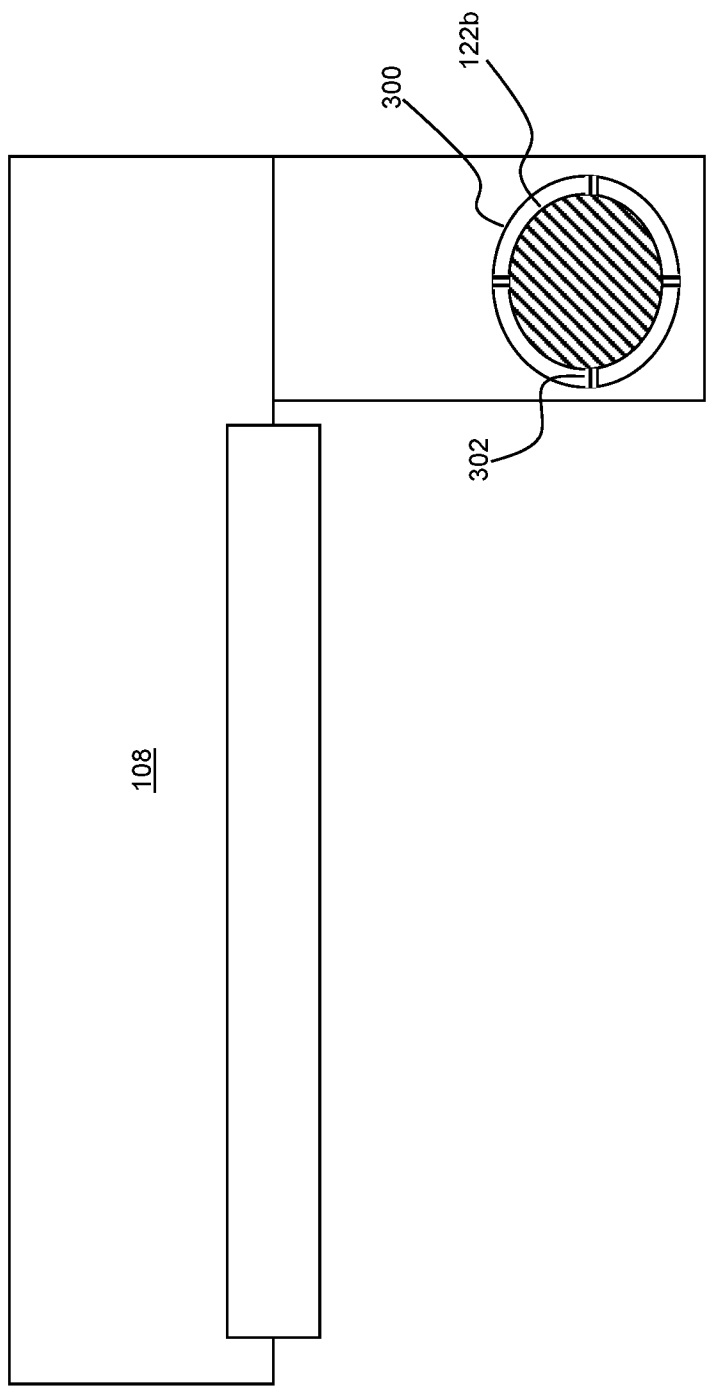
FIG. 3 is a rail supporting the roller of the additive manufacturing system, shown along an end-view of the rail as depicted in FIG. 2A.
Figure 4:
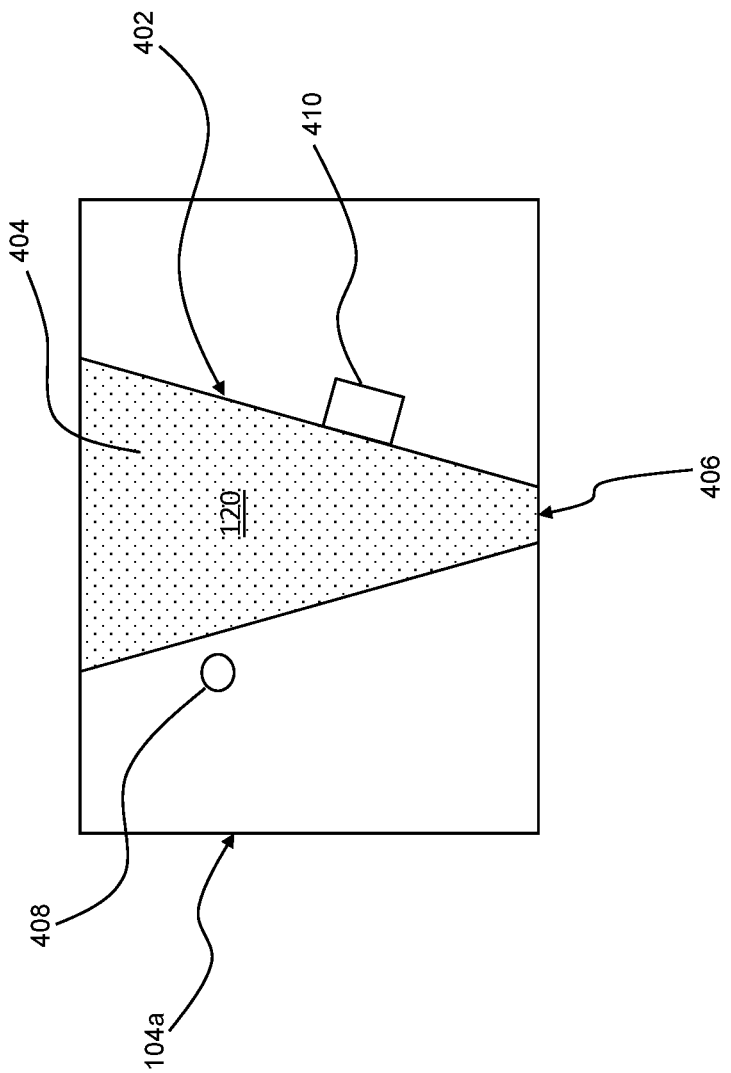
FIG. 4 is a schematic representation of a material carriage of the additive manufacturing system of FIG. 1A.
Figure 5:
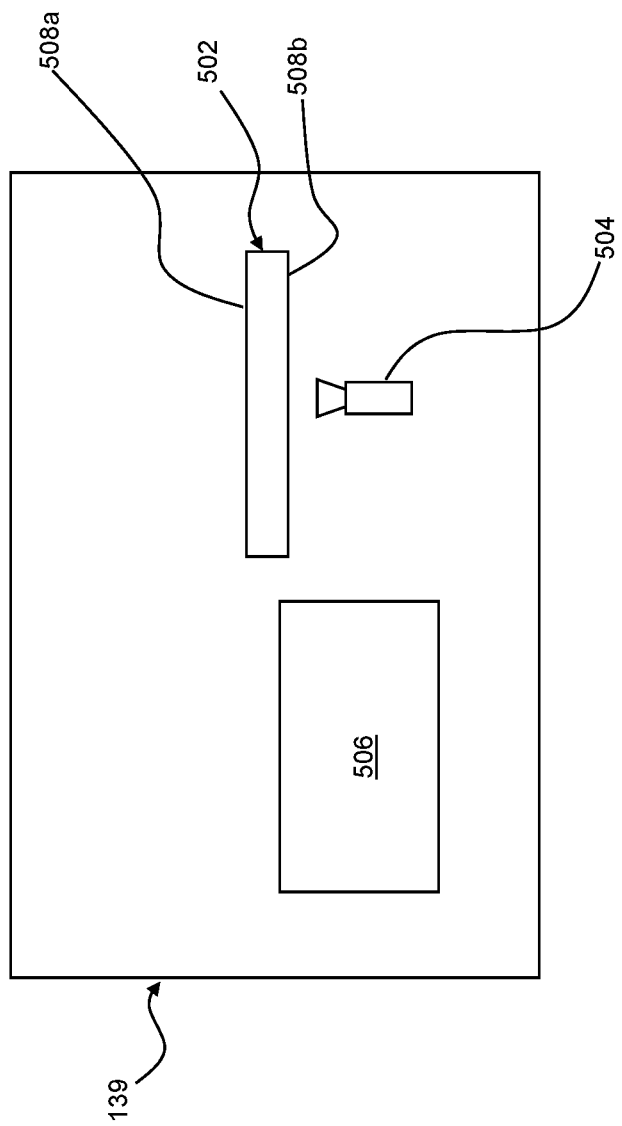
FIG. 5 is a schematic representation of a wash station of the additive manufacturing system of FIG. 1A.

Referring now to FIG. 3, the additive manufacturing system may include a brush 300 including filaments 302 having free ends. The brush 300 may be coupled to the roller 108 to move with the roller 108 along the second rail 122b. As the brush 300 moves with the roller 108 along the second rail 122b, one or more of the filaments 302 may be in contact with the second rail 122b such that the filaments 302 may remove debris from the second rail 122b. While the brush 300 has been described as having filaments 302, it should be appreciated that the brush 300 may, further or instead, any of various different types of cleaning surfaces suitable for removing debris from the second rail 122b without damaging the second rail 122b as the brush 300 moves along with the roller 108. Thus, for example, the brush 300 may further or instead include non-woven material in contact with the second rail 122b.

Referring again to FIGS. 1A-1D and FIGS. 2A-2B, the print carriage 106 may define at least one ejection orifice 130. In general, the print carriage 106 may be selectively actuatable (e.g., electrically actuatable) to eject the binder 112 through the at least one ejection orifice 130 to produce a controlled a two-dimensional pattern of the binder 112 on the layer of the powder 120 spread by the roller 108 along the top of the volume 208. Given that the two-dimensional pattern may be different for different two-dimensional slices, the print carriage 106 may produce varying patterns of the binder 112 as required for the layer-by-layer fabrication of the three-dimensional object. These varying patterns may be produced according to any of various different techniques known in the art of ink jet printing. Thus, for example, the print carriage 106 may include at least one print bar. In turn, each print bar may include a plurality of print heads (e.g., piezoelectric print heads), and each print head may define at least one of the plurality of ejection orifices. Each print head may be independently controllable relative to each of the other print heads to facilitate accurate delivery of the binder according to a given controlled two-dimensional pattern associated with a two-dimensional slice being formed as the print carriage 106 moves across the volume 208.

The at least one ejection orifice 130 may be shaped and arranged according to any of various different patterns useful for producing a suitable distribution of the binder 112 in a controlled two-dimensional pattern along the layer. For example, the at least one ejection orifice 130 may include a plurality of instances of the at least one ejection orifice 130, and each instance of the at least one ejection orifice 130 may be substantially similar to each other instance of the at least one ejection orifice 130. Such similarity between instances of the at least one ejection orifice may be useful, for example, for producing uniform distributions of the binder 112. Further, or instead, the at least one ejection orifice 130 may include a plurality of orifices spaced relative to one another to span one or more dimensions along the top of the volume 208, with such spatial distribution contributing advantageously to uniformity of binder distribution. As an example, the at least one ejection orifice 130 may include a plurality of orifices spaced relative to one another along a direction substantially perpendicular to the lateral dimension L of the volume as the print carriage 106 moves over the lateral dimension "L."

In certain implementations, the print carriage 106 may be advantageously formed to have substantially similar performance in the different directions of movement associated with a multi-directional binder jetting process. As an example, the at least one ejection orifice 130 may be directed relative to the volume 208 to eject the binder 112 in a direction substantially perpendicular to the volume 108 as the print carriage moves over the volume 208. This orientation of the at least one ejection orifice 130 may be useful, for example, for jetting the binder 112 in a manner that is substantially independent of the direction of movement of the print carriage 106 as the binder 112 is jetted toward the volume 208. In turn, eliminating or at least reducing directional artifacts associated with directing the binder 112 toward the volume 208 may result in improvements in accuracy of the three-dimensional object 210 being formed.

Referring now to FIGS. 1A-1D, FIGS. 2A-2B, and FIG. 4, the first material carriage 104a and the second material carriage 104b may be substantially identical to one another, except that each is generally a mirror configuration of the other with respect to at least one plane extending through the print carriage 106. This symmetry of the first material carriage 104a and the second material carriage 104b may be particularly advantageous for achieving substantially similar layer characteristics in each direction of the binder jetting process carried out by the additive manufacturing system 100. In turn, such similar layer characteristics may facilitate forming the three-dimensional object 210 within target dimensional tolerances. That is, the three-dimensional object 210 may be formed substantially without defects associated with changing direction of the layer-by-layer fabrication process. Accordingly, for the sake of clarity and efficient description, the features of the first material carriage 104a are described below and, unless another intention is indicated, corresponding aspects of the second material carriage 104b shall be understood to be identical to those of the first material carriage 104a and are not described separately.

The first material carriage 104a may include a hopper 402 defining a storage region 404 in fluid communication with the dispensing region 406 such that the powder 120 is movable (e.g., through the force of gravity, through the use of actuators, or a combination thereof) from the storage region 404 toward the volume 208 via the dispensing region 406. The storage region 404 may store, for example, a quantity of the powder 120 sufficient for forming multiple layers of the three-dimensional object 210. As a competing consideration, however, the capacity of the storage region 404 may be limited by space and weight considerations associated with rapid movement of the first material carriage 104a in some applications.

To facilitate management of moisture in the quantity of the powder 120 stored in the storage region 404, the first material carriage 104a may include a heater 408 in thermal communication with the storage region 404 of the hopper 402. The heater 408 may be any of various different types of heaters known in the art and, thus, may include a resistance heater. In some instances, the heater 408 may be adjustable to maintain the powder 120 in the storage region 404 at a predetermined temperature, such as a predetermined temperature provided by an operator of the machine.

Additionally, or alternatively, to facilitate management of settling of the powder 120 stored in the storage region 404, the first material carriage 104a may include an agitator 410 in mechanical communication with the storage region 404 of the hopper 402. In general, the agitator 410 may vibrate walls of the storage region 404 at frequencies that are useful for reducing the likelihood of the powder 120 sticking to the walls of the storage region 404 while not interfering with overall movement of the first material carriage 104a across the volume 208. By way of example, the agitator 410 may include a piezoelectric element actuatable to vibrate the storage region 404.

The dispensing region 406 of the hopper 402 may span a width of the volume 208. As used in this context, the width of the volume 208 shall be understood to be a dimension along the top of the volume 208 and perpendicular to the lateral dimension L of the volume 208. With the dispensing region 406 spanning the width of the volume 208, the powder 120 may be dispensed along the entire width of the volume 208 as the first material carriage 104a moves over the volume 208. As compared to other patterns of distribution of the powder 120, distributing the powder 120 along the entire width of the volume 208 may facilitate achieving a substantially uniform distribution of the powder 120 in front of the roller 108 which, in turn, may facilitate forming uniform layers of the powder 120.

In general, the roller 108 may be symmetric such that the characteristics of the layers of the powder 120 spread in each direction over the lateral dimension L of the volume 208 are substantially similar. Thus, for example, the roller 108 may include a substantially cylindrical shape, which may be a particularly useful shape for achieving similar powder spreading characteristics in both directions of movement over the lateral dimension L of the volume 208. That is, continuing with this example, the roller 108 may positioned relative to the lateral dimension L such that an axial dimension of the cylindrical shape is perpendicular to the lateral dimension L as the roller 108 rotates about the axial dimension to spread the powder 120 in front of the roller 108. It should be generally appreciated that the roller 108 may additionally, or alternatively, include any manner and form of components useful for supporting a rotating member to carry out any one or more of the various different techniques described herein. Thus, for example, the roller 108 may include a housing through which the second rail 122b may extend such that the roller 108 is supported along the second rail 122b by the housing while the roller 108 rotates to spread the powder 120.

In certain instances, the roller 108 may be actively and/or passively rotatable about the axial dimension of the cylindrical shape. As an example, the roller 108 may be driven to rotate in a direction substantially opposite a direction of travel of the roller 108 over the volume 208—with rotation in this direction being generally referred to herein as counter-rotation. As used herein, counter-rotation of the roller 108 shall be understood to include rotation of the roller 108 in a direction opposite to a direction of free rotation of the roller 108 in the absence of the applied rotational force as the roller 108 moves over the volume 208 with the roller in contact with the powder 120. As compared to passive rotation of the roller 108 and/or active rotation of the roller in the direction of travel of the roller 108, counter-rotating the roller 108 may produce a more even distribution of the powder 120 in the layer formed by the roller 108.

In some instances, additive manufacturing system 100 may include a z-stage actuator 132 coupled to the second rail 122b. The z-stage actuator 132 may include, for example, a servomotor suitable for precise control of linear position of the second rail 122b. Further, or instead, the z-stage actuator 132 may include a linear encoder paired with a vertical position scale on the print box 102 or along another fixed vertical position. In general, the z-stage actuator 132 may be selectively actuated to move the second rail 122b, and, thus the roller 108, up and down relative to the plane 212 defined by the top of the volume 208. More specifically, the z-stage actuator 132 may be selectively actuated to move the roller 108 in a direction perpendicular to the plane 212 defined by the top of the volume 208, which may also be understood to be a direction perpendicular to the lateral dimension L of the volume.

For example, in some implementations, the z-stage actuator 132 may be selectively actuated to adjust the thickness of a layer of the powder 120 spread by the roller 108 as the roller 108 moves over the lateral dimension L of the volume 208. As a more specific example, the z-stage actuator 132 may be selectively actuated to adjust the thickness of the layer to a predetermined value of greater than about 50 microns and less than about 150 microns, with lower values generally being better suited to achieving higher dimensional accuracy of the three-dimensional model at the cost of longer fabrication times.

Additionally, or alternatively, the z-stage actuator 132 may be selectively actuatable to move the roller 108 relative to the print carriage 106 along the z-stage to create clearance between the roller 108 and the print carriage 106. With such clearance, the print carriage 106 may move past the roller 108 to swap an orientation of the print carriage 106 and the roller 108 relative to the lateral dimension L of the volume 208. This may be observed, for example, through a comparison of the relative orientations of the roller 108 and the print carriage 106 shown in FIGS. 1B and 1D. In each case, the roller 108 is positioned closest to the lateral dimension L of the volume 208 at the beginning of each pass across the lateral dimension L to form a new layer.

In general, the relative movement between the roller 108 and the print carriage 106 may include moving one of these components relative to the volume 208 along the z-stage while the other is in a fixed position relative to the volume 208 along the z-stage or moving both components (e.g., in substantially opposite directions) relative to the volume 208 along the z-stage. Thus, for example, the z-stage actuator 132 may be actuatable to move the roller 108 above and below the plane 212 defined by the top of the volume 208 as part of a sequence of coordinated component movements that facilitate using the roller 108 to spread the powder 120 in both directions of movement over the lateral dimension L of the volume 208. For example, the print box 102 may define a first recess 134a and a second recess 134b on opposite sides of the print box 102 and, thus, on opposite sides of the lateral dimension L of the volume 208. As described in greater detail below, the z-stage actuator 132 may be selectively actuatable to move the roller 108 into the first recess 134a and into the second recess 134b to facilitate switching the relative orientation of the roller 108 and the z-stage actuator 132 relative to the lateral dimension L of the volume 208 such that the roller 108 may precede the print carriage 106 over the lateral dimension L in each direction of the multi-directional fabrication processes carried out by the additive manufacturing system 100. As the roller 108 is moved into the first recess 134a and the second recess 134b, the print carriage 106 and the first rail 122a associated with the print carriage may be substantially fixed such that the movement of the roller 108 above and below the plane 212 changes the clearance between the roller 108 and the print carriage 106.

In certain implementations, the additive manufacturing system 100 may include an actuator 136 mechanically coupled (e.g., directly mechanically coupled) to a bottom surface 138 of the print box 102. Through actuation of the actuator 136, the bottom surface 138 of the print box 102 may be moved in a direction away from the print carriage 106 to increase a depth dimension "D" of the volume 208 as the three-dimensional object 210 is formed in the volume 208. In general, the actuator 136 may be any of various different types of known mechanical actuators useful for precisely controlled vertical translation. For example, the actuator 136 may be moveable to move the bottom surface 138 of the print box by a distance of about the thickness of each layer (e.g., about 40 microns to about 150 microns) with each pass of the print carriage 106 over the volume 208.

Referring now to FIGS. 1A-1D, FIGS. 2A-2B, and FIG. 5, the additive manufacturing system 100 may, in some instances, include a wash station 139. In certain implementations, performance of the print carriage 106 may degrade over time, such as through normal mechanical wear, fouling from particles of the powder 120 or other contaminants, or any of various other different other root causes. Such degradation in performance of the print carriage 106 may manifest as a corresponding degradation in quality of the three-dimensional object 210 being formed. Thus, in certain instances, the wash station 139 may be positioned relative to the print carriage 106 to facilitate addressing, or at least mitigating, certain degradation mechanisms of the print carriage 106. The wash station 139 may be away from the lateral dimension L of the volume 208 to reduce the likelihood that the washing process will interfere with the fabrication process. Thus, for example, the wash station 139 may be disposed along one or more positions lateral to the lateral dimension L of the volume 208. As a more specific example, the wash station 139 may be positioned in proximity to one or both positions at which the print carriage 106 reverses direction as part of a multi-directional fabrication process.

The wash station 139 may include one or more of a substrate 502 and a camera 504. The substrate 502 may have a first side 508a and a second side 508b, with the first side 508a and the second side 508b opposite one another. The camera 504 may be positioned along the first side 508a of the substrate 502, with a lens of the camera 504 directed at the substrate 502. The substrate 502 may be any of various different materials (e.g., a clear plastic film) through which the camera 504 may form an image indicative of performance of the at least one ejection orifice 130 of the print carriage 106. As an example, the print carriage 106 may be movable to a position along the second side 508b of the substrate 502 such that the substrate 502 is disposed between the print carriage 106 and the camera 504. Continuing with this example, the print carriage 106 may direct a spray pattern toward (e.g., onto) the second side 508b of the substrate 502. The camera 504 may form an image of the spray pattern for comparison to a known exemplar indicative of whether the print carriage 106 is performing properly.

In general, any of various different corrective actions may be taken upon detection of degraded performance of the print carriage 106. For example, in extreme cases, fabrication may be interrupted. Additionally, or alternatively, an alert may be sent to an operator. Still further or instead, one or more corrective actions may be taken at the wash station 139. As an example, the wash station 139 may include a wash solution source 506, and the print carriage 106 may be exposed to a wash solution from the wash solution source 506 based at least in part on a condition of the print carriage 106 sensed by the camera 504. While the exposure to the wash solution may be based on detecting degraded performance of the print carriage 106 in some instances, it should be appreciated that the wash solution may be directed to the print carriage 106 as part of each inspection of the print carriage 106, particularly in instances in which the wash solution itself is mild. In general, the wash solution may be any of various different cleaning solutions known in the art for removing contamination from a surface.

In general, the print carriage 106 may be moved to the wash station 139 at any of various different intervals suitable for maintaining suitable performance of the print carriage 106. Thus, for example, the print carriage 106 may be moved to the wash station 139 at substantially fixed time intervals (e.g., every 5 minutes). Additionally, or alternatively, the print carriage 106 may be moved to the wash station 139 at an interval defined by the number of layers of the three-dimensional object 210 being formed (e.g., every 50 layers). Further, or instead, the print carriage 106 may be moved to the wash station 139 between formation of instances of the three-dimensional object 210. Still further or instead, the print carriage 106 may be moved to the wash station 139 based at least in part on detection of one or more defects in the three-dimensional object 210 being formed or detection of such defects in one or more previously formed instances of the three-dimensional object 210.

The additive manufacturing system 100 may include a controller 140. The controller may be in electrical communication with any one or more of the first material carriage 104a, the print carriage 106, the second material carriage 104b, the roller 108, the first motor 126a, the second motor 126b, the gas source 128, the z-stage actuator 132, and the actuator 136. For example, the controller 140 may include one or more processors 141 operable to control any one or more of the various different components of the additive manufacturing system 100, as may be useful and/or necessary to carry out any one or more of the additive manufacturing techniques described herein.

The additive manufacturing system 100 may, additionally or alternatively, include a non-transitory, computer readable storage medium 142 in communication with the controller 140 and having stored thereon a three-dimensional model 143 and instructions for causing the one or more processors 141 to carry out any one or more of the methods described herein. In certain implementations, the controller 140 may retrieve the three-dimensional model 143 in response to user input and generate machine-ready instructions for execution by the additive manufacturing system 100 to fabricate the three-dimensional object 210.

Figure 1B:
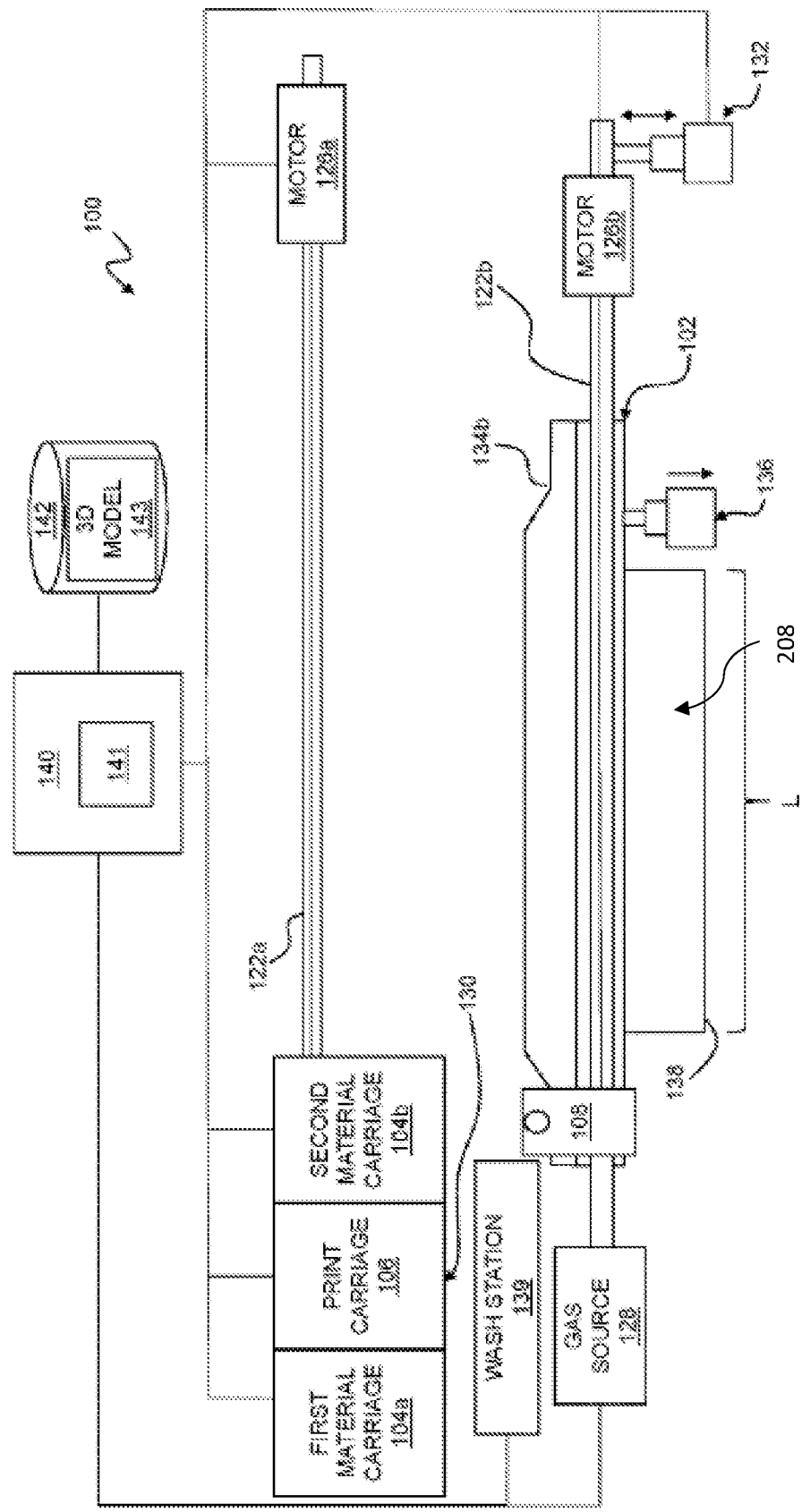
Figure 1C:
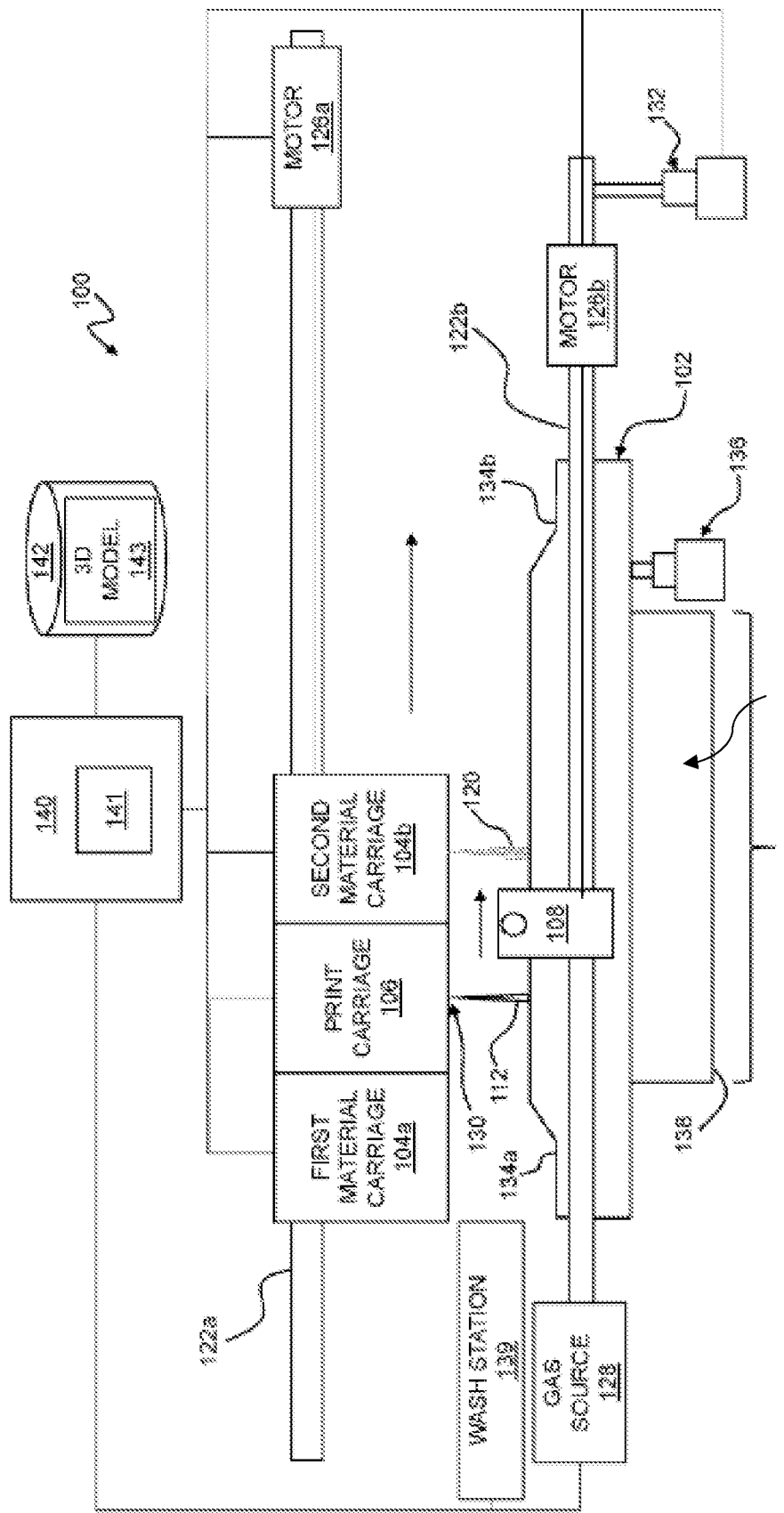
Figure 1D:
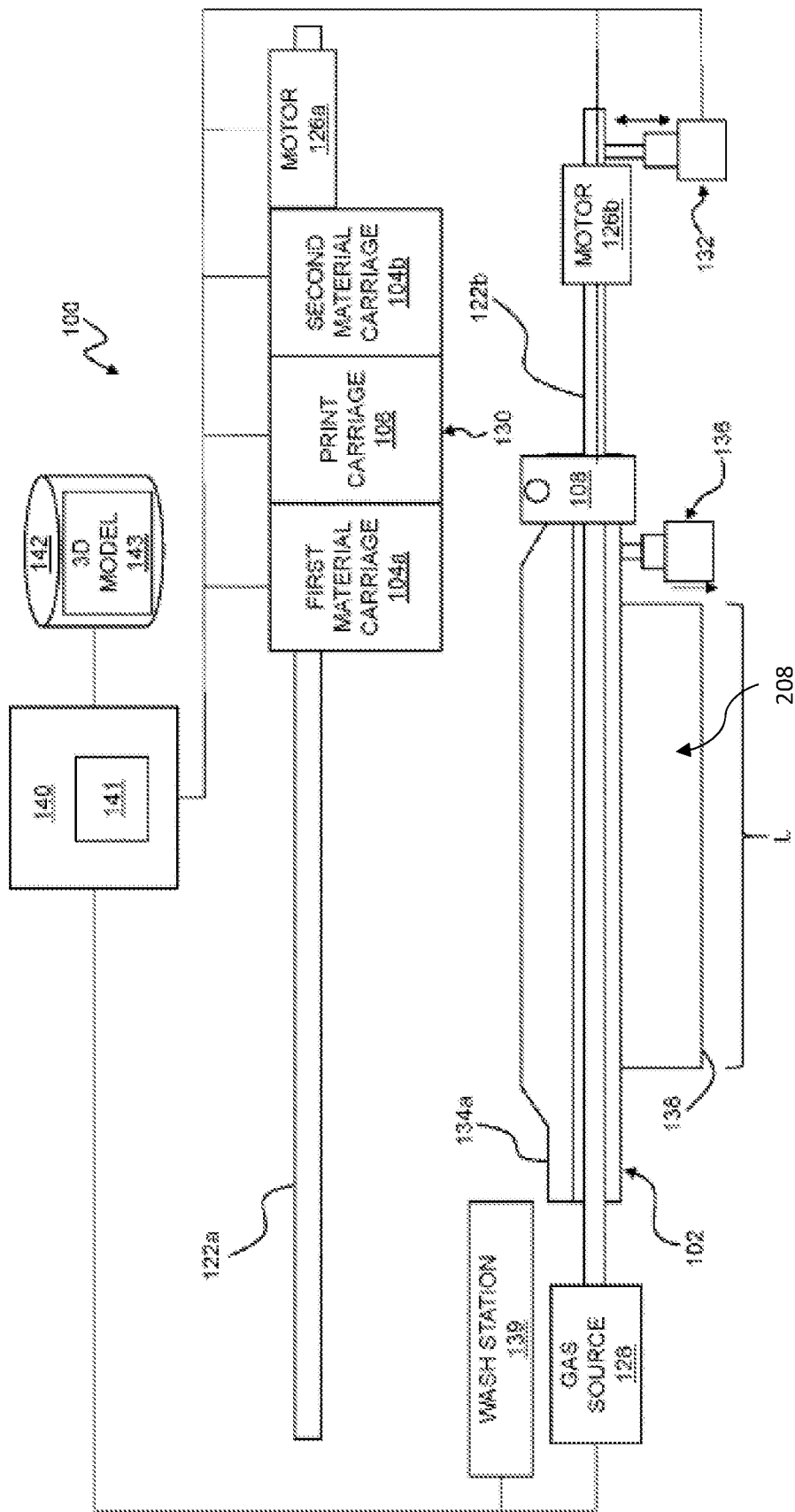
Figure 2A:
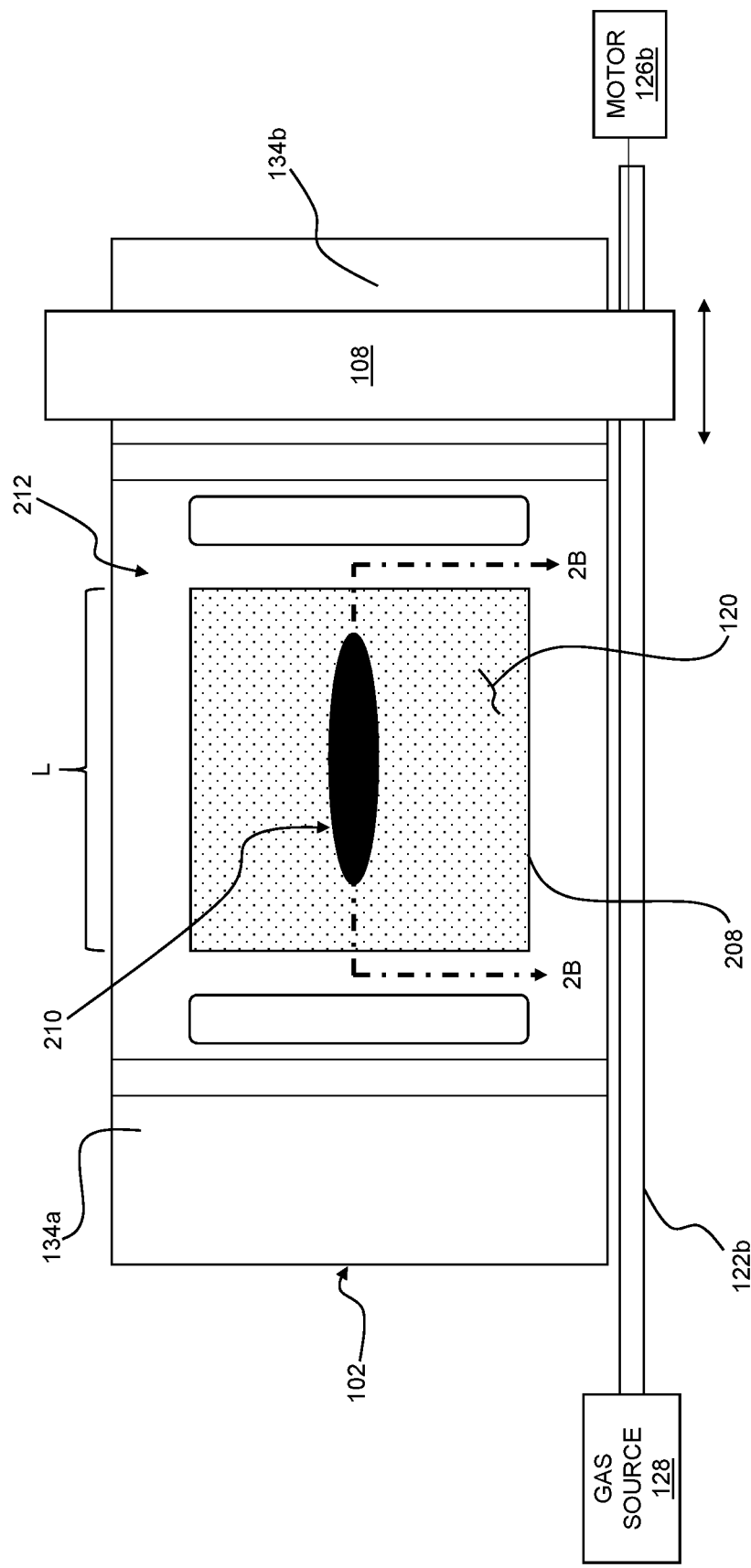
FIG. 2A is a top view of a print box and a roller of the additive manufacturing system in the state corresponding to FIG. 1D.
Figure 2B:
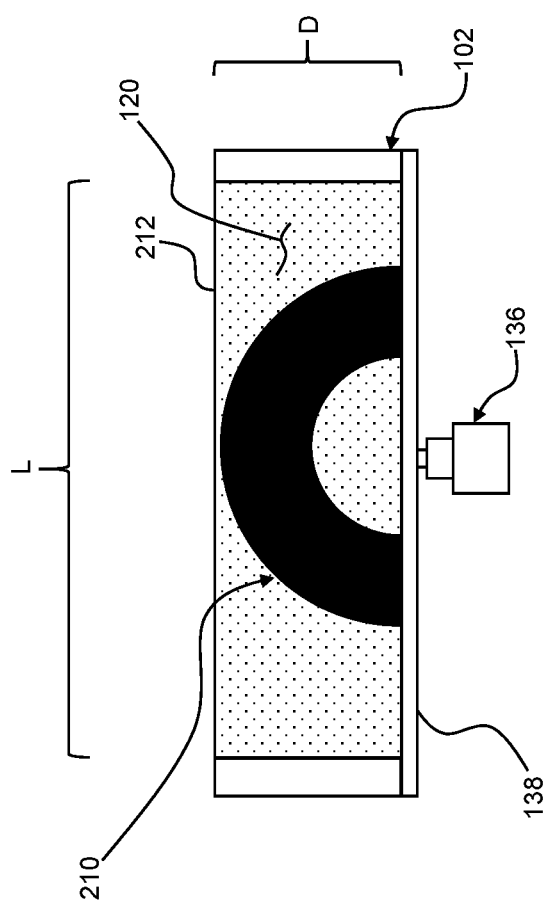
FIG. 2B is a cross-sectional view of the print box of the additive manufacturing system of FIG. 1A shown along line 2B-2B of FIG. 2A.

In general, the controller 140 may control any one or more of the various different components of the additive manufacturing system 100 to carry out any one or more of the various different fabrication techniques described herein. Thus, for example, the controller 140 may control the relative movement of the print carriage 106 and the roller 108 such that the roller 108 is positioned in advance of the print carriage 106 in each direction of bidirectional movement of the print carriage and the spreader along the lateral dimension L above the volume 208 as part of a multi-directional binder jetting fabrication process. For example, the roller 108 may precede the print carriage 106 over the volume 208 in a first direction of the lateral dimension L to spread a first layer of the powder 120 along the volume 208 (FIG. 1A). The print carriage 106 may follow the roller 108 in the first direction, and the controller 140 may selectively actuate the print carriage 106 to deliver the binder 112 toward the first layer in a controlled two-dimensional pattern associated with the first layer to form a first two-dimensional slice of the three-dimensional object 210 being fabricated. Following formation of the first layer, the controller 140 may switch the lateral order of the roller 108 and the print carriage 106 relative to the lateral dimension L of the volume 208 (FIG. 1B). In a second direction (opposite the first direction) of the lateral dimension "L," the roller 108 may precede the print carriage 106 over the volume 208 to spread a second layer of the powder 120 along the volume 208 (FIG. 1C). The print carriage 106 may follow the roller 108 in the second direction, and the controller 140 may selectively actuate the print carriage 106 to deliver the binder 112 toward the second layer in a controlled two-dimensional pattern associated with the second layer to form a second two-dimensional slice of the three-dimensional object 210 being fabricated. Following formation of the second layer, the controller 140 may switch the lateral order of the roller 108 and the print carriage 106 relative to the lateral dimension L of the volume 208 (FIG. 1D). Such alternating formation of layers may be repeated as necessary to form the three-dimensional object 210.

By way of example, the controller 140 may adjust spacing of one or both of the roller 108 and the print carriage 106 relative to the plane 212. In general, this adjustment may be carried out by the controller 140 in coordination with the bidirectional movement of the print carriage 106 and the roller 108 to swap an orientation of the print carriage and the spreader relative to the lateral dimension L of the volume 208. For example, the controller 140 may control spacing between the print carriage 106 and the roller 108 to position the roller 108 and the print carriage 106 on opposite sides of the plane 212, such as through selective activation of the z-stage actuator 132 coupled to the second rail 122b while the first rail 122a remains fixed or, in some implementations, is moved in a z-stage direction away from the roller 108 (e.g., by actuation of another z-stage actuator coupled to the first rail 122a). Continuing with this example, the controller 140 may selectively activate the z-stage actuator 132 to control the spacing between the roller 108 and the print carriage 106 such that the roller 108 is at least partially disposed below the plane 212 (e.g., at least partially disposed in a respective one of the first recess 134a and the second recess 134b defined by the print box 102) as the print carriage 106, above the plane 212, moves past the roller 108 in a direction parallel to the lateral dimension L of the volume 208 to swap the orientation of the print carriage 106 and the roller 108. Following movement of the print carriage 106 over the roller 108 to swap the orientation of these components, the controller 140 may move the roller 108 from a position below the plane 212 to a position above the plane 212.

While certain implementations have been described, other implementations are additionally or alternatively possible.

For example, while the additive manufacturing system 100 has been described as using the z-stage actuator 132 coupled to the second rail 122b while the first rail 122a remains fixed, it should be appreciated that any of various different arrangements of z-stage actuators may be used to change spacing between the first rail 122a and the second rail 122b. Thus, in an alternative implementation, the z-stage actuator 132 may be coupled to the first rail 122a while the second rail 122b remains in a fixed position. Additionally, or alternatively, each of the first rail 122a and the second rail 122b may be associated with a respective z-stage actuator. Continuing with this example, the z-stage actuators may be differentially driven to change the spacing between the first rail 122a and the second rail 122b.

Figure 6:
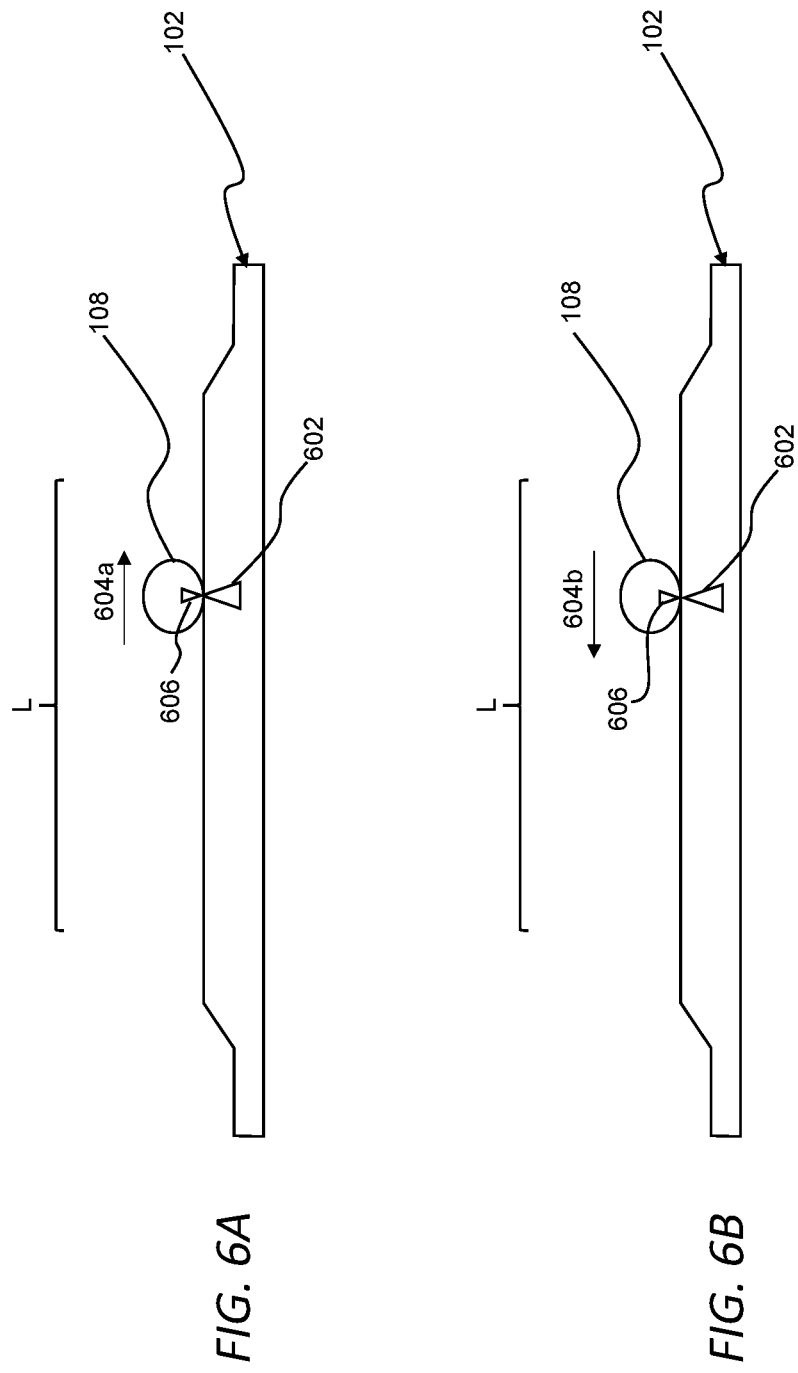
FIGS. 6A and 6B are schematic representations of a position of a roller relative to a landmark along a lateral dimension of a volume of the additive manufacturing system of FIG. 1A as the roller moves in a first direction (FIG. 6A) and in a second direction (FIG. 6B) opposite the first direction.

As another example, while the roller 108 has been described as being driven to counter-rotate in certain implementations, additional or alternative movement of the roller 108 may be useful for achieving substantially uniform distribution of the powder 120 in each layer of a multi-directional binder jetting process to form the three-dimensional object 110. For example, referring now to FIG. 2A and FIGS. 6A and 6B, the roller 108 may be additionally or alternatively controlled based on one or more landmarks 602 along the lateral dimension L of the volume 208 as the roller 108 moves across the lateral dimension L in a first direction 604a and in a second direction 604b, with the first direction 604a and the second direction 604b opposite one another.

As a more specific example, the roller 108 may be controlled to synchronize one or more angular positions 606 of the roller 108 with the one or more landmarks 602 along the lateral dimension L. That is, as the roller 108 rotates about an axis (e.g., as defined by an axial dimension of the roller 108), the one or more angular positions 606 may be in contact with the powder 120 along points of the lateral dimension L corresponding to the respective one or more landmarks 602. By controlling such alignment in the first direction 604a, and in the second direction 604b, the same portion of the roller 108 may form the same portion of alternating layers of the powder 120 in each direction, as may be appreciated through a comparison of FIGS. 6A and 6B. In general, even with highly controlled geometric tolerances, the roller 108 may have certain non-uniform characteristics that may be imparted to alternating layers of the powder 120 if left uncontrolled. Thus, controlling the position of the roller 108 based on one or more predetermined landmarks along the dimension of the volume may be useful for reducing layer-to-layer variation that may arise from non-uniformity of the roller 108.

In general, synchronizing the one or more angular positions 606 of the roller 108 with the one or more landmarks 602 may be achieved through any of various different techniques useful for aligning an angular position with a linear position. Thus, for example, synchronization may be achieved by mechanically imposing the appropriate synchronization, such as through the use of gears. Additionally, or alternatively, synchronization may be monitored based on feedback from a combination of a rotary encoder (monitoring the angular position of the roller 108) and linear encoder (monitoring the position of the roller 108 along the lateral dimension L). That is, information from these encoders may provide an indication of the relative position of the one or more angular positions 606 of the roller 108 relative to the respective one or more landmarks 602. Continuing with this example, the position of the roller 108 may be adjusted by adjusting, for example, an angular speed of the roller 108 based on the feedback from the encoders. Additionally, or alternatively, the position of the roller 108 may be adjusted by adjusting the speed of movement of the roller 108 in the lateral direction L over the volume 208.

Figure 7:
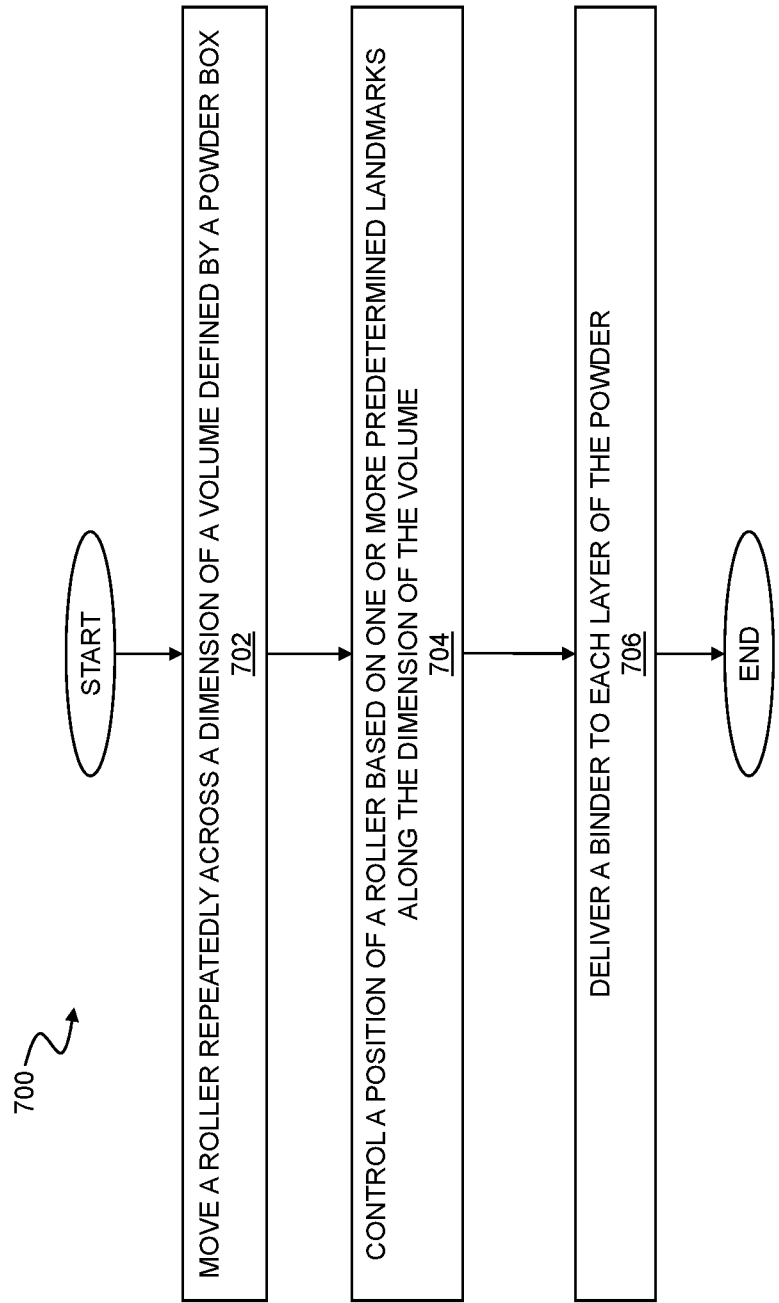
FIG. 7 is a flowchart of an exemplary method of controlling a roller for additive manufacturing.

FIG. 7 is a flowchart of an exemplary method 700 of controlling a roller for additive manufacturing. In general, unless otherwise specified or made clear from the context, the exemplary method 700 may be carried out using any one or more of the additive manufacturing systems described herein. Thus, for example, one or more steps of the exemplary method 700 may be carried out by the additive manufacturing system 100 (FIG. 1A). Additionally, or alternatively, unless otherwise indicated or made clear from the context, the exemplary method 700 may be carried out as part of a single-direction binder fabrication process, a multi-direction binder fabrication process, or a combination thereof.

As shown in step 702, the exemplary method 700 may include moving a roller across a dimension (e.g., a lateral dimension) of a volume defined by a print box. The roller may rotate, for example, about an axis transverse to the dimension of the volume as the roller moves across the dimension such that each movement of the roller across the dimension spreads a respective layer of a plurality of layers across the print box. By way of example and not limitation, the roller may be moved bidirectionally across the dimension of the volume, with each pass of the roller across the dimension of the volume forming a respective layer of the plurality of layers. Additionally, or alternatively, moving the roller may include rotating the roller about the axis in a direction opposite to a direction of movement of the roller across the dimension of the volume—that is, the roller may be counter-rotated as the roller is moved across the dimension of the volume.

As shown in step 704, the exemplary method 700 may include controlling a position of the roller based on one or more predetermined landmarks along the dimension of the volume. In general, as the roller moves across the dimension, the roller undergoes two types of motion—an angular rotation about the axis and a linear movement across the volume. Thus, controlling the position of the roller may include controlling an angular velocity of the roller about the axis, controlling a linear velocity of the roller across the dimension of the volume, or a combination thereof.

The one or more predetermined landmarks may include any of various different positions useful for controlling the roller. Thus, for example, the one or more predetermined landmarks may include a position corresponding substantially to a first edge of the print box first encountered by the roller as the roller is moved across the dimension of the volume. This type of landmark may be useful for, among other things, initiating the synchronization at the start of each layer. Additionally, or alternatively, the one or more predetermined landmarks may include one or more positions away from edges of the print box, with such positions being useful for maintaining a degree of synchronization as the roller moves across the volume. In some implementations, the one or more predetermined landmarks may be at regular distance intervals along the dimension of the volume (e.g., as part of a dimensional scale read by a linear encoder positioned to detect a lateral position of the roller as the roller moves over the volume). While regular intervals may be useful in certain implementations, it should be understood that irregular intervals may be used without departing from the scope of the present disclosure.

In implementations in which the roller is moved bidirectionally across the volume, the rotation of the roller may be controlled based on the one or more predetermined landmarks for each direction of movement of the roller across the dimension of the volume. The landmarks used for controlling the position of the roller may be the same in each direction of movement of the roller, which may be useful in instances in which the spreading characteristics are substantially independent of the direction of angular rotation of the roller. However, in certain implementations, the predetermined landmarks forming the basis for alignment be different in each direction, such as may be useful for accounting for directional anomalies associated with different directions of angular rotation of the roller. Continuing with this example, the predetermined landmarks may include a first subset of landmarks and a second subset of landmarks, different from the first subset of landmarks. The position of the roller may be controlled based on the first subset of landmarks as the roller moves in the first direction across the volume, and the position of the roller may be controlled based on the second subset of landmarks as the roller moves in the second direction across the volume.

In certain implementations, controlling the position of the roller based on the one or more predetermined landmarks along the dimension of the print box may include synchronizing one or more angular positions of the roller, as the roller rotates about the axis, to the one or more predetermined landmarks as the roller moves across the dimension of the volume. For example, synchronizing the one or more angular positions may include receiving a signal from rotary encoder or a similar sensor positioned to measure rotation of the roller about the axis. Additionally, or alternatively, synchronizing the one or more angular positions may include receiving a signal from a linear encoder or a similar sensor positioned to measure the movement of the roller moving along the dimension of the volume. One or both of the rotary encoder and the linear encoder may be any of various different sensors paired with a suitable scale (an angular scale in the case of the rotary encoder and a linear scale in the case of the linear encoder) for converting the encoded position to a signal suitable for controlling the position of the roller.

The position of the roller may be controlled at any of various different times as may be useful for reducing layer-to-layer variation. Thus, in some instances, the position of the roller may be controlled between the formation of successive layers of the plurality of layers. For example, after a first layer has been formed, the relative alignment between angular positions of the roller and the one or more predetermined landmarks may be used in the aggregate (e.g., based on an average difference) as the basis for controlling the position of the roller. In addition to or instead of controlling the roller position between formation of successive layers, the position of the roller may be controlled as the roller is moved across the dimension of the volume. As an example, as the roller passes each landmark of a plurality of landmarks, an adjustment to the roller position may be made based on the relative alignment of the angular position of the roller and the respective landmark.

As shown in step 706, the exemplary method 700 may include delivering a binder to each layer of the powder in a controlled two-dimensional pattern associated with the respective layer. The controlled two-dimensional patterns of the layers of the plurality of layers may collectively define a three-dimensional object in the print box according to any one or more of the various different techniques described herein.

Figure 8:
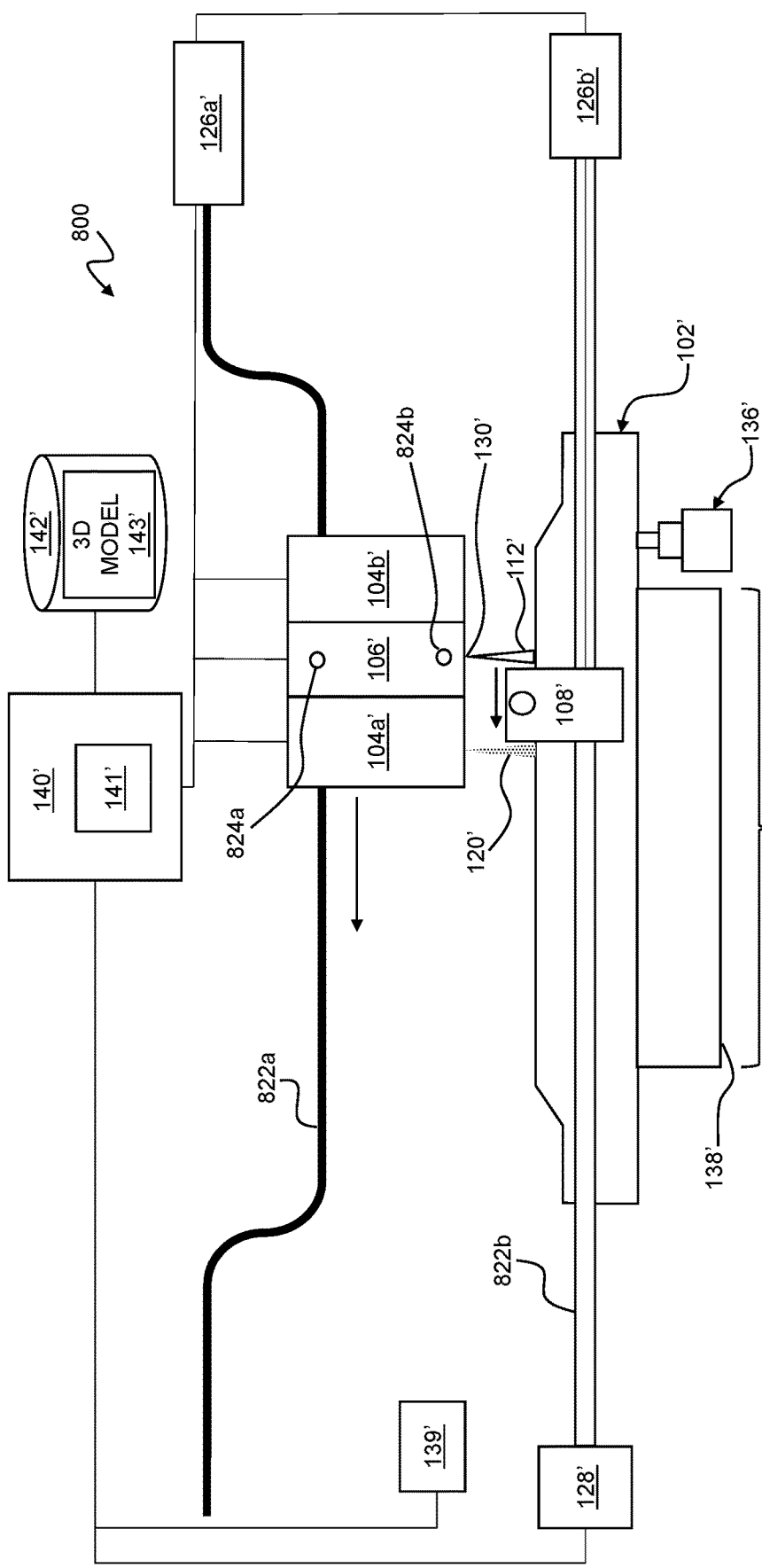
FIG. 8 is a schematic representation of an additive manufacturing system including shaped rails.

As another example, while additive manufacturing systems have been described as using z-stage actuators to swap positions of a roller and a print carriage, other approaches are additionally or alternatively possible. For example, referring now to FIG. 8, an additive manufacturing system 800 may include a first rail 822a and a second rail 822b shaped relative to one another to facilitate switching the order of components. Each component designated with a prime element number (') in FIG. 8 should be understood to be analogous to the corresponding component designated with an unprimed element number in FIGS. 1A-1B and, thus, for the sake of efficient explanation, is not described separately, except to point out differences. Thus, for example, the print box 102' should be understood to define a volume having a lateral dimension L', with the volume defined by the print box' being analogous to the volume 208 (FIG. 2). Further, unless otherwise specified or made clear from the context, the first rail 822a and the second rail 822b should be understood to be analogous to the first rail 122a and the second rail 122b, respectively, except as set forth in the description that follows. More generally, unless otherwise specified or made clear from the context, the additive manufacturing system 800 should be understood to be operable to carry out multi-directional binder jetting fabrication of three-dimensional objects according to any one or more of the techniques described above with respect to the additive manufacturing system 100 (FIG. 1A).

In general, the print carriage 106' and the roller 108' may be movable relative to one another to swap positions such that the roller 108' precedes the print carriage 106' over the volume defined by the print box 102' in each direction of bidirectional movement along the lateral dimension L' of the volume defined by the print box 102'. For example, the print carriage 106' may be movable, on the first rail 822a, along the lateral dimension L' of the volume defined by the print box 102', and the roller 108' may be movable, along the second rail 822b, along the lateral dimension L' of the volume defined by the print box 102'. Continuing with this example, the first rail 822a and the second rail 822b may be shaped relative to one another such that, as the print carriage 106' and the roller 108' move along the first rail 822a and the second rail 822b, respectively, the relative shaping of the rails adjusts corresponding spacing (e.g., a distance in a direction perpendicular to a plane defined by the top of the volume) between the roller 108' and the print carriage 106'. As the spacing between the print carriage 106' and the roller 108' changes, the roller 108' may pass under the print carriage 106' (and/or the print carriage 106' may pass over roller 108') to switch lateral positions with respect to the lateral dimension L' of the volume defined by the print box 102'. These positions may generally be switched following formation of a given layer and, therefore, may be switched at one or more positions lateral to the lateral dimension L' of the volume defined by the print box 102'.

In general, at least one of the first rail 822a and the second rail 822b may be axially nonlinear. As used, in this context, axially nonlinear should be understood to be any of various different paths along an axis defined by the rail and including at least one curved section along an axial dimension of the respective rail. For instance, in the implementation depicted in FIG. 8, the first rail 822a should be understood to be axially nonlinear, as it is shown as having three linear sections and two curved sections along a path defined by the axial dimension. It should be appreciated, however, that this is by way of example and should not be considered to be limiting.

In certain implementations, the first rail 822a and the second rail 822b may be substantially parallel to one another along respective portions of each rail corresponding to travel of the print carriage and the spreader above the lateral dimension of the volume. That is, the first rail 822a and the second rail 822b may be shaped such that the print carriage 106' and the roller 108' move substantially parallel to one another as these components move over the volume to form a two-dimensional slice of a three-dimensional object being fabricated. In a more specific example, the first rail 822a and the second rail 822b may be shaped such that these parallel portions are substantially linear. Continuing with this example, given that the first rail 822*a* and the second rail 822*b* are shaped to guide the print carriage 106' and the roller 108' along parallel linear paths above the volume, it should be understood that one or both of the first rail 822*a* and the second rail 822*b* may have an axially non-linear section along one or more positions lateral to the lateral dimension L' of the volume defined by the print box 102' such that the overall shape of one or both of the first rail 822*a* or the second rail 822*b* is axially nonlinear.

In some implementations, one or both of the first rail 822*a* and the second rail 822*b* may include an axially nonlinear section corresponding to movement of a respective instance of the print carriage 106' or the roller 108', as the case may be, along a nonlinear path above the lateral dimension L' above the volume defined by the print box 102'. For example, the first rail 822*a* may include a substantially parabolic section having a minimum along the lateral dimension L' above the volume defined by the print box 102'. In such instances, the print carriage 106' may move along the lateral dimension L' in a substantially parabolic path above the volume defined by the print box 102'. Such a parabolic shape may facilitate, for example, achieving an acceleration and deceleration profile of the print carriage 106' useful for achieving rapid directional changes as part of a multi-directional fabrication process. In certain implementations, ejection of the binder 112' from the print carriage 106' may be adjusted to account for time of flight associated with the parabolic movement of the of the print carriage 106' along the lateral dimension L'.

In general, the roller 108' may be movable along the lateral dimension L', above the volume, at a substantially fixed distance to facilitate, for example, spreading a substantially uniform layer of the powder. Further, or instead, the roller 108' may have an axial dimension substantially perpendicular to the lateral dimension L' as the roller 108' moves along the lateral dimension L', above the volume.

In certain implementations, it may be desirable to measure a position of one or both of the print carriage 106' and the roller 108' along a respective one of the first rail 822*a* or the second rail 822*b*, as the case may be. Such measurement may be useful, for example, for controlling the speed and/or direction of movement of the print carriage 106' and the roller 108' along the respective rails to reduce the likelihood of collision between these components as directions are switched. Thus, for example, the print carriage 106' may include a first optical encoder 824*a* positioned to sense a position of the print carriage 106' on the first rail 822*a* as the print carriage 106' moves, on the first rail 822*a*, along the lateral dimension L', above the volume. Additionally, or alternatively, the print carriage 106' may include a second optical encoder 824*b* positioned to sense a position of the print carriage 106' relative to the build volume as the print carriage 106' moves, on the first rail 822*a*, along the lateral dimension L', above the volume. For example, the second optical encoder 824*b* may sense a height of the print carriage 106' above the volume. Additionally, or alternatively, the second optical encoder 824*b* may sense a lateral position of the print carriage 106' relative to the lateral dimension L' of the volume. Thus, for example, as one or both of the first optical encoder 824*a* and the second optical encoder 824*b* senses that the print carriage 106' is in a raised position associated with swapping components, the roller 108' may be accelerated to move underneath the print carriage 106' to swap positions in preparation for fabrication of the next layer of the three-dimensional object. While the first optical encoder 824*a* and the second optical encoder 824*b* have been described as being disposed on the print carriage 106', it should be understood that one or both of these encoders may be positioned on the roller 108' and used to control position in an analogous manner.

Figure 9:
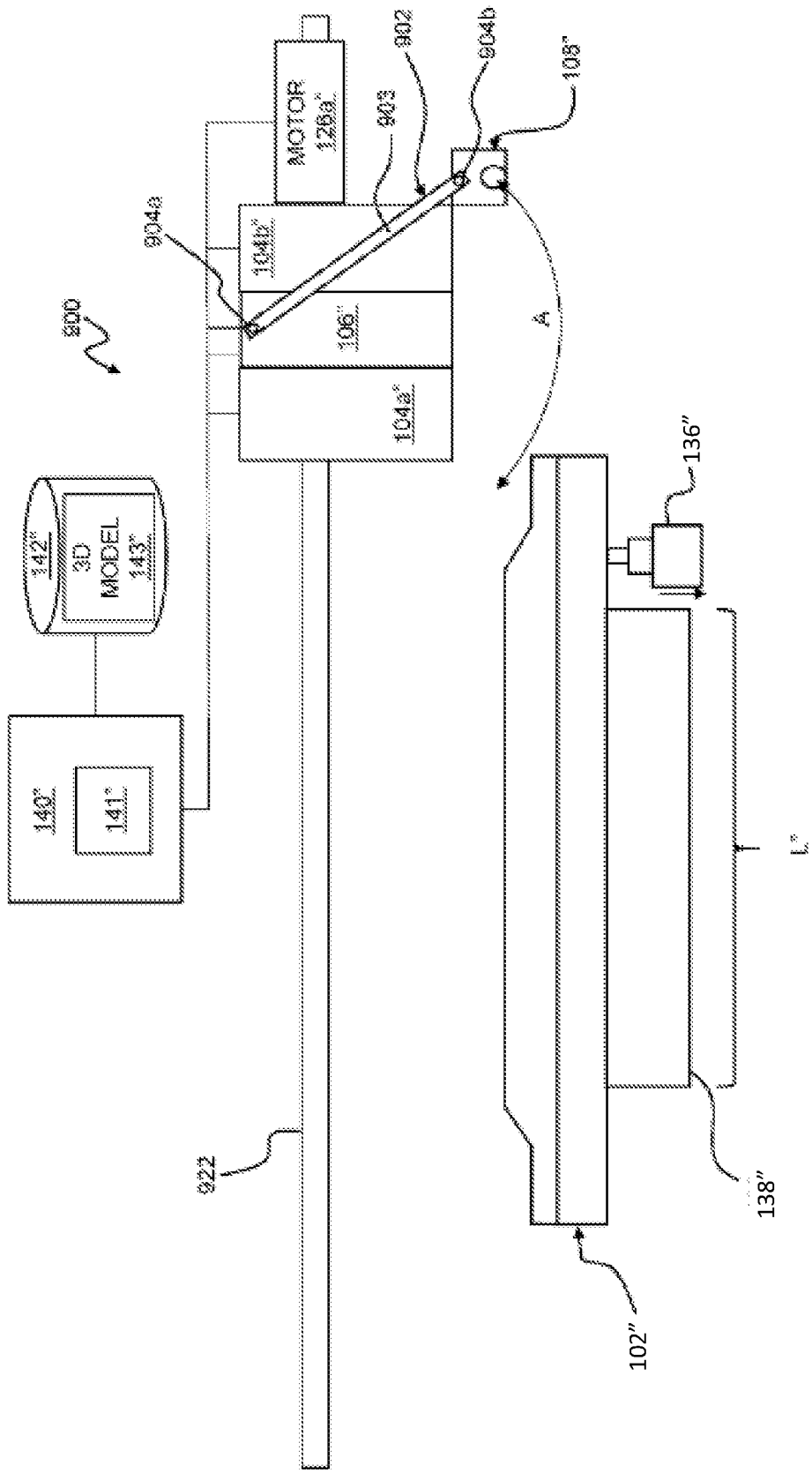
FIG. 9 is a schematic representation of an additive manufacturing system including a swing arm.

As another example, while certain techniques have been described for moving print carriages and rollers relative to one another to achieve a desired order of components in multi-directional binder jetting operations, other techniques are additionally or alternatively possible. For example, referring now to FIG. 9, an additive manufacturing system 900 may include a swing arm 902 selectively movable to switch the order of components as part of a multi-directional binder jetting process. Each component designated with a double prime element number (") in FIG. 9 should be understood to be analogous to the corresponding component designated with an unprimed element number in FIGS. 1A-1B and, thus, for the sake of efficient explanation, is not described separately, except to point out differences. Thus, for example, the print box 102" should be understood to define a volume having a lateral dimension L", with the volume defined by the print box" being analogous to the volume 208 (FIG. 2). Further, unless otherwise specified or made clear from the context, the rail 922 should be understood to be analogous to the first rail 122*a*, except as set forth in the description that follows. More generally, unless otherwise specified or made clear from the context, the additive manufacturing system 900 should be understood to be operable to carry out multi-directional binder jetting fabrication of three-dimensional objects according to any one or more of the techniques described above with respect to the additive manufacturing system 100 (FIG. 1A).

In general, the swing arm 902 may include an elongate member 903, a first joint 904*a*, a second joint 904*b*. The first joint 904*a* and the second joint 904*b* may be, for example, pivot joints arranged at opposite end regions of the elongate member 903 to pivot about respective axes perpendicular to the lateral dimension L". Additionally, or alternatively, one or more of the first joint 904*a* and the second joint 904*b* may include an actuator (e.g., a rotary actuator, a magnet, a combination thereof) to control the position of the first joint 904*a* or the second joint 904*b*, as the case may be. For example, through such one or more actuators, the swing arm 902 may be actuatable to pivot about the first joint 904*a* and the second joint 904*b*.

The swing arm 902 may be pivotably coupled to the print carriage 106" along the first joint 904*a* and pivotably coupled to the roller 108" along the second joint 904*b*. Through actuation of the swing arm 902, the elongate member 903 may pivot about the first joint 904*a* and the second joint 904*b* to move the roller 108" along a substantially arcuate path A. Generally, the swing arm 902 may be actuated at one or more positions lateral to the lateral dimension L" such that the substantially arcuate movement of the roller 108" does not make unintended contact with the print box 102" or the powder in the volume defined by the print box 102."

As the roller 108" moves along the substantially arcuate path A, the roller 108" moves from one side of the print carriage 106" to another side of the print carriage 106." Thus, through actuation of the swing arm 902, the roller 108" may be positioned in advance of the print carriage 106" in each direction of bidirectional movement of the print carriage and the roller along the lateral dimension, above the volume.

In general, the swing arm 902 may mechanically couple the print carriage 106" to the roller 108" such that the print carriage 106" and the roller 108" may be moved together along the rail 922. As compared to other approaches, therefore, it should be appreciated that the additive manufacturing system 900 may offer certain advantages with respect to requiring at least one less rail. Additionally, or alternatively, because the print carriage 106" and the roller 108" are coupled to one another, the additive manufacturing system 900 may offer certain advantages with respect to coordinating the timing of movement of the print carriage 106" and the roller 108" relative to one another during the course of a multi-directional binder jetting process.

In certain implementations, the elongate member 903 may be lockable in a fixed position relative to the first joint 902*a* and the second joint 902*b* as the print carriage 106" and the roller 108" move along the lateral dimension, above the volume. That is, the elongate member 903 may be locked in place to hold the roller 108" in a substantially fixed position (e.g., at a substantially fixed height relative to the powder) as the print carriage 106" and the roller 108" move along the rail 922 to form a given two-dimensional slice of a three-dimensional object as part of a layer-by-layer fabrication process. The elongate member 903 may be locked in place through any one or more of various different techniques suitable for preventing pivoting motion about the first joint 902*a* and the second joint 902*b*. As an example, the first joint 902*a* and the second joint 902*b* may each include electromagnetically actuatable magnets that may be activated (or deactivate) to release the roller 108" for movement along the substantially arcuate path A.

As still another example, while additive manufacturing systems have been described as including rollers, it should be generally appreciated that any of various different types of spreaders may additionally or alternatively be used to carry out various different techniques described herein, unless otherwise made clear from the context. Thus, for example, the additive manufacturing systems described herein may additionally or alternatively include any manner and form of elongate element useful for spreading powder substantially uniformly across a volume to carry out various different additive manufacturing techniques described herein. Thus, for example, additive manufacturing systems described herein may additionally or alternatively include a doctor blade.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. An additive manufacturing system comprising:
   a print box defining a volume having a lateral dimension;
   a print carriage movable above the volume, the print carriage defining at least one orifice directed toward the volume as the print carriage moves above the volume;
   a roller transverse to the lateral dimension; and
   a swing arm including an elongate member having a first end region and a second end region, a first joint disposed along the first end region, and a second joint disposed along the second end region, the elongate member pivotably coupled to the print carriage along a first joint and pivotably coupled to the roller along a second joint, and the swing arm actuatable to pivot the elongate member about the first joint and the second joint to move the roller along a substantially arcuate path relative to the print carriage to position the roller in advance of the print carriage in each direction of bidirectional movement of the print carriage and the roller along the lateral dimension, above the volume.

2. The system of claim 1, further comprising a rail, wherein the print carriage and the roller are bidirectionally movable on the rail along the lateral dimension, above the volume.

* * * * *